(12) United States Patent
Ohta et al.

(10) Patent No.: US 8,422,110 B2
(45) Date of Patent: Apr. 16, 2013

(54) OPTICAL SWITCH

(75) Inventors: Masahiko Ohta, Tokyo (JP); Osamu Ishibashi, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 13/140,965

(22) PCT Filed: Dec. 16, 2009

(86) PCT No.: PCT/JP2009/070948
§ 371 (c)(1),
(2), (4) Date: Jun. 20, 2011

(87) PCT Pub. No.: WO2010/071141
PCT Pub. Date: Jun. 24, 2010

(65) Prior Publication Data
US 2011/0255148 A1    Oct. 20, 2011

(30) Foreign Application Priority Data

Dec. 18, 2008 (JP) ................................. 2008-322727
Dec. 18, 2008 (JP) ................................. 2008-322734
Dec. 18, 2008 (JP) ................................. 2008-322735

(51) Int. Cl.
*G02F 1/03* (2006.01)
(52) U.S. Cl.
USPC ............ 359/245; 359/252; 359/256; 359/305
(58) Field of Classification Search .................... 359/245
See application file for complete search history.

(56) References Cited

U.S. PATENT DOCUMENTS 6,204,952 B1 * 3/2001 Hinkov et al. ................ 359/245
2007/0216316 A1   9/2007 Hirano et al.

FOREIGN PATENT DOCUMENTS

| JP | 62-293217 | 12/1987 |
| JP | 63-200119 | 8/1988 |
| JP | 64-046733 | 2/1989 |
| JP | 2666805 | 6/1997 |
| JP | 2007-079487 | 3/2007 |
| JP | 2007-279681 | 10/2007 |

OTHER PUBLICATIONS

International Search Report, PCT/JP2009/070948, Jan. 26, 2010.

* cited by examiner

*Primary Examiner* — James Jones
(74) *Attorney, Agent, or Firm* — Young & Thompson

(57) ABSTRACT

An optical switch changes the refractive index of an electro-optical crystal according to an electric field applied to the electro-optical crystal so as to switch depending on whether the electro-optical crystal enables incident light to pass through or whether the electro-optical crystal enables incident light to be totally reflected. The optical switch includes an electrode section including a plurality of electrodes and formed in the electro-optical crystal, a principal plane including the largest area of each electrode on a same plane of the electro-optical crystal; an insulator layer on at least one plane of the electro-optical crystal, the plane being parallel with the electrode section, the insulator layer made of an insulator with lower dielectric constant than the electro-optical crystal; and a temperature control device formed on and in contact with the insulator layer and controls a temperature of the electrode section or dissipates heat generated in the electrode section.

21 Claims, 18 Drawing Sheets

(a)

(b)

(a)

(b)

(a)

(b)

(a)

(b)

(a)

(b)

OPTICAL SWITCH

TECHNICAL FIELD

The present invention relates to optical switches that switch between transmission and the reflection of light.

BACKGROUND ART

In the field of optical communication, optical switches that perform switching of light according to a voltage that causes the refractive index of a crystal having an electro-optical effect (electro-optical crystal) to change are known.

Among those, waveguide type optical switches such as a directional coupling optical switch using the proximity effect of two waveguides, and a Mach-Zehnder interferometer-type photonic switch that generates a phase difference between lights that propagate the waveguides according to an external voltage applied between waveguides, and that uses optical interference that occurs therebetween have been proposed. Since these waveguide type optical switches can change the refractive index at high speed, they can perform switching at high speed.

As another type, an optical switch that uses the Bragg effect presented for example in Japanese Patent No. 2666805 (hereinafter referred to as Patent Document 1) is known.

FIG. 1 is a perspective view showing a structure of an optical switch according to a related art reference.

As shown in FIG. 1, the optical switch according to the related art reference has optical waveguide layer 2 made of a non-linear optical substance having the electro-optical effect (electro-optical crystal); and first electrode group 11 and second electrode group 12 that are formed in optical waveguide layer 2.

First electrode group 11 and second electrode group 12 each are composed of a plurality of planar electrodes 1 that can expand and make contact in the direction of the thickness of optical waveguide layer 2. The individual electrodes of first electrode group 11 and those of second electrode group 12 are alternately arranged at a predetermined interval such that the cross-section of a plane of the electrodes perpendicular to the direction of the thickness of optical waveguide layer 2 is formed in the shape of a comb.

When a voltage is applied between first electrode group 11 and second electrode group 12 of the optical switch shown in FIG. 1, the refractive index of the nonlinear optical substance of optical waveguide layer 2 periodically changes. The portion of the nonlinear optical substance in which the refractive index periodically changes functions as a diffraction grating that reflects incident light, so called the Bragg reflection. On the other hand, when the voltage applied between the first and second electrode groups is stopped, since the portion does not function as a diffraction grating, the incident light passes through the region between the planar electrodes.

When the foregoing optical switch is used for optical communication or the like, the extinction ratio that represents the difference between the intensity of transmitted light in the ON state and that in the OFF state can be around 10:1. However, when the optical switch is used for example for an optical modulator of an image display device, an optical switch having a higher extinction ratio than is used for optical communication or the like is desired so as to improve the luminance and contrast ratio.

In addition, an optical switch used for an image display device or the like needs to have a high optical damage resistance. An optical switch used for an image display device needs to modulate light of several ten to several hundred mW or greater. The size of the waveguide used in the foregoing waveguide type optical switch is typically several μm. Since the intensity of light per unit square with which such a waveguide type optical switch is irradiated is high and thereby the nonlinear optical crystal or the like tends to be optically damaged, it is difficult to use such an optical switch for an image display device.

In addition, when the refractive index of the electro-optical crystal is caused to be changed according to an electric field applied thereto, the refractive index changes depending on the temperature of the crystal. When the magnitude for which the refractive index changes fluctuates according to the temperature, the intensity of output light of the optical switch also changes. Thus, to stably operate the optical switch, the temperature at which the refractive index changes in the electro-optical crystal needs to be maintained in an appropriate range.

The optical switch presented in Patent Document 1 does not have a structure that takes into account how the refractive index of the electro-optical crystal changes depending on the temperature. Thus, when the first and second electrode groups are irradiated with light and thereby their temperatures rise, since the refractive index based on the applied voltage also changes, the wavelength and direction of light reflected by the diffraction grating may become unstable, namely, the operation of the optical switch may become unstable depending on the environment and surrounding temperature of the optical switch.

CITATION LIST

Patent Document

[Patent Document 1] Japanese Patent No. 2666805

SUMMARY

Therefore, an object of the present invention is to provide optical switches that have a higher extinction ratio, optical damage resistance, and temperature stability, and that can perform higher speed operation and lower power consumption operation, and that have smaller structures than previously.

To accomplish the foregoing object, an exemplary aspect of the optical switch of the present invention is an optical switch that changes the refractive index of an electro-optical crystal according to an electric field applied to the electro-optical crystal so as to switch depending on whether the electro-optical crystal enables incident light to pass through or whether the electro-optical crystal enables incident light to be totally reflected, comprising:

an electrode section that is composed of a plurality of electrodes and that is formed in the electro-optical crystal, a principal plane including the largest area of each of the plurality of electrodes being present on a same plane of the electro-optical crystal;

an insulator layer that is formed on at least one plane of the electro-optical crystal, the plane being parallel with the electrode section, the insulator layer being made of an insulator having a lower dielectric constant than the electro-optical crystal; and a temperature control device that is formed to be in contact with the insulator layer and that controls a temperature of the electrode section or that dissipates heat generated in the electrode section.

Alternatively, an exemplary aspect of the optical switch of the present invention is an optical switch that changes a refractive index of an electro-optical crystal according to an electric field applied to the electro-optical crystal so as to switch depending on whether the electro-optical crystal enables incident light to pass through or whether the electro-optical crystal enables incident light to be totally reflected, comprising:

an electrode section that is composed of a plurality of electrodes and that is formed in the electro-optical crystal, a principal plane including the largest area of each of the plurality of electrodes being present on a same plane of the electro-optical crystal;

an insulator layer that is formed on at least one plane of the electro-optical crystal, the plane being parallel with the electrode section, the insulator layer being made of an insulator having a lower dielectric constant than the electro-optical crystal; and a temperature control device that is formed to be in contact with the insulator layer and that controls a temperature of the electrode section or that dissipates heat generated in the electrode section, wherein the electro-optical crystal has a refractive index change section whose refractive index changes according to the electric field that is applied to the electrode section, the refractive index change section fully covers the electrode section, and a refractive index interface of the refractive index change section is evenly formed.

Alternatively, an exemplary aspect of the optical switch of the present invention is an optical switch that changes a refractive index of an electro-optical crystal according to an electric field applied to the electro-optical crystal so as to switch depending on whether the electro-optical crystal enables incident light to pass through or whether the electro-optical crystal enables incident light to be totally reflected, comprising:

an electrode section that is composed of a plurality of electrodes and that is formed in the electro-optical crystal, a principal plane including the largest area of each of the plurality of electrodes being present on a same plane of the electro-optical crystal, wherein anti reflection coats are formed respectively on a light incident plane to which light enters and on at least one plane from among a light exit plane from which transmitted light exits and a light exit plane from which reflected light exits.

Alternatively, an exemplary aspect of the optical switch of the present invention is an optical switch that changes a refractive index of an electro-optical crystal according to an electric field applied to the electro-optical crystal so as to switch depending on whether the electro-optical crystal enables incident light to pass through or whether the electro-optical crystal enables incident light to be totally reflected, comprising:

an electrode section that is composed of a plurality of electrodes and that is formed in the electro-optical crystal and that applies the electric field to the electro-optical crystal;

anti reflection coats formed respectively on a light incident plane to which light enters and on at least one plane from among a light exit plane from which transmitted light exits and a light exit plane from which reflected light exits, wherein the electro-optical crystal has a refractive index change section whose refractive index changes according to the electric field that is applied to the electrode section, the refractive index change section fully covers the electrode section, and a refractive index interface of the refractive index change section is evenly formed.

Alternatively, an exemplary aspect of the optical switch of the present invention is an optical switch that changes a refractive index of an electro-optical crystal according to an electric field applied to the electro-optical crystal so as to switch depending on whether the electro-optical crystal enables incident light to pass through or whether the electro-optical crystal enables incident light to be totally reflected, comprising:

an electrode section that is composed of a plurality of electrodes and that is formed in the electro-optical crystal, a principal plane including the largest area of each of the plurality of electrodes being present on a same plane of the electro-optical crystal;

an insulation section that is formed in contact with at least part of the electrode section that has a higher thermal conductivity and a lower dielectric constant than the electro-optical crystal; and a temperature control section that is formed on a plane of the insulation section and dissipates heat generated in the electrode section or controls a temperature of the electrode section.

Alternatively, an exemplary aspect of the optical switch of the present invention is an optical switch that changes a refractive index of an electro-optical crystal according to an electric field applied to the electro-optical crystal so as to switch depending on whether the electro-optical crystal enables incident light to pass through or whether the electro-optical crystal enables incident light to be totally reflected, comprising:

an electrode section that is composed of a plurality of electrodes and that is formed in the electro-optical crystal that applies the electric field to the electro-optical crystal;

an insulation section that is formed in contact with at least part of the electrode section that has a higher thermal conductivity and a lower dielectric constant than the electro-optical crystal; and a temperature control section that is formed on a plane of the insulation section and controls a temperature of the electrode section or dissipates heat generated in the electrode section, wherein the electro-optical crystal has a refractive index change section whose refractive index changes according to the electric field applied to the electrode section, the refractive index change section fully covers the electrode section, and a refractive index interface of the refractive index change section is evenly formed.

EXEMPLARY EMBODIMENT

Next, with reference to drawings, the present invention will be described.

Figure 2:
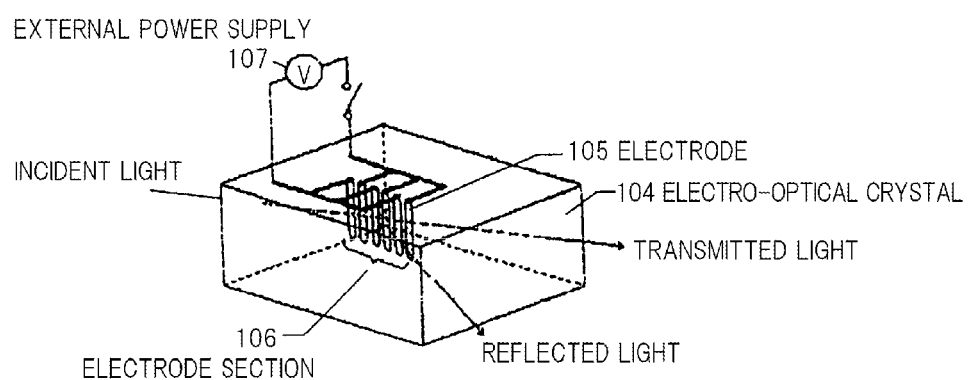
FIG. 2 is a perspective view showing an exemplified structure of an optical switch according to the present invention.

As described above, the optical switch presented in Patent Document 1 controls transmission and diffraction of incident light using a diffraction grating that occurs as the refractive index changes. Instead of the structure in which transmission and diffraction of incident light are controlled by such a diffraction grating, an optical switch that controls transmission and reflection of incident light using a refractive index change section that occurs in an electro-optical crystal that is formed in the proximity of electrodes according to a voltage applied to the electrodes and to, the refractive index change section covering the electrodes, is known. FIG. 2 is a perspective view showing a structure of the optical switch.

In the optical switch shown in FIG. 2, a plurality of rod shaped electrodes 105 are arranged at a relatively narrow interval in electro-optical crystal 104 and a voltage is applied from external power supply 107 to each of electrodes 105 such that adjacent electrodes have different polarities. Light is obliquely entered into electro-optical crystal 104 to the normal direction of electrode section 106 composed of electrodes 105 that are arranged along a straight line. Electrode section 106 is composed of electrodes 105 that are arranged in such a manner that a principal plane including the maximum area is present on the same plane, electrodes 106 have the same film thickness and are arranged in parallel and at an equal interval. As described above, a voltage is applied to electrodes 105 such that the polarities of adjacent polarities become different from each other.

Figure 3:
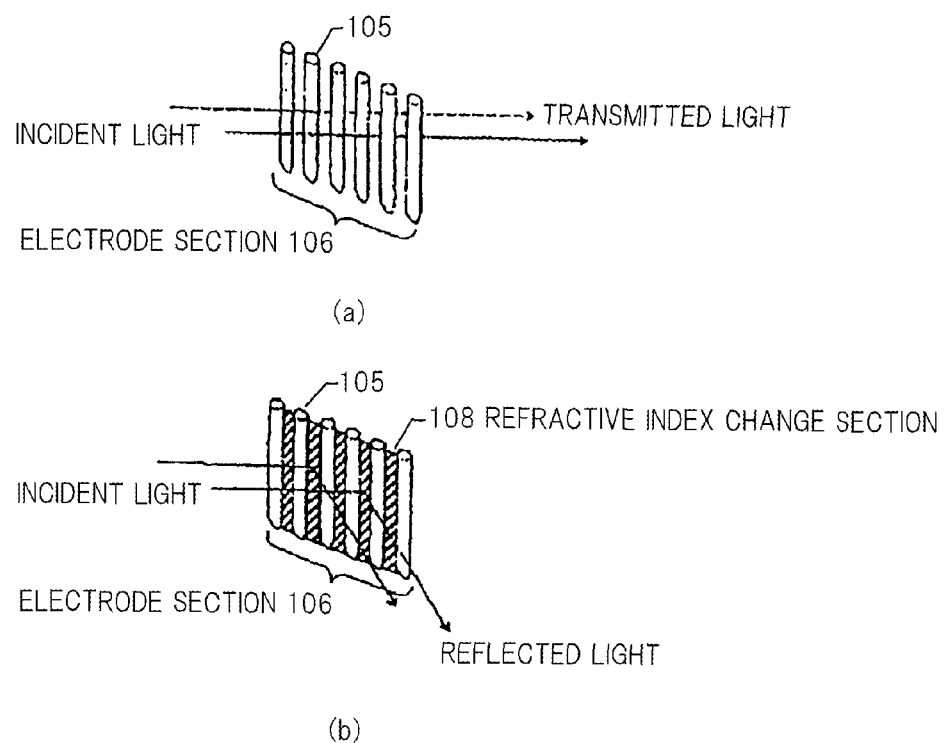
FIG. 3 is a schematic diagram showing a theory of operation of the optical switch shown in FIG. 2.

When a voltage is not applied to electrode section 106, as shown in FIG. 3(a), since the diffractive index of electro-optical crystal 104 in the proximity of electrode section 106 does not change, incident light 101 passes through electrode section 106 and exits to the outside (transmitted light). On the other hand, when a voltage is applied to electrode section 106, as shown in FIG. 3(b), since an electric field occurs between electrodes 105, the refractive index of electro-optical crystal 104 in the proximity of electrode section 106 changes and thereby refractive index change section 108 occurs. At this point, refractive index change section 108 occurs such that it entirely covers electrodes 105 and a refractive index interface nearly occurs evenly. Thus, incident light having an incident angle equal to or greater than the critical angle totally reflects on refractive index change section 108 and then the reflected light exits to the outside.

Thus, the optical switch shown in FIG. 2 can switch between exit planes of light depending on whether or not a voltage is applied to electrode section 106 and thereby can perform switching of light.

In addition, the optical switch shown in FIG. 2 is a bulk type optical switch where light passes through electro-optical crystal 104 that does not need to provide a waveguide structure. Thus, the optical switch allows the intensity of light irradiated per unit volume to be lowered and thereby the optical damage resistance to be improved in comparison with waveguide type optical switches. As a result, the optical switch can switch an optical beam with a relatively larger aperture (several ten to several hundred μm) than waveguide type optical switches.

In addition, since the optical switch shown in FIG. 2 has a structure in which electrodes 105 are arranged at an equal interval of several μm to several ten μm, namely a relatively narrow interval, a relatively low voltage allows a strong electric field to be generated in the electro-optical crystal between electrodes 105 and thereby allows a refractive index change section to occur. Thus, the voltage applied to electrode section 106 can be lowered. In addition, since the cross section of each of electrodes 105 is relatively small, the inter-electrode capacitance can be lower than that of the optical switch presented in Patent Document 1 that uses planar electrodes.

Since the power consumption at a high speed operation of the optical switch is proportional to both the second power of the applied voltage and the inter-electrode capacitance, when the applied voltage and the inter-electrode capacitance are lowered, the power consumption can be reduced in comparison with the optical switch presented in Patent Document 1. Moreover, since the operational frequency bandwidth is reversely proportional to the inter-electrode capacitance, when the inter-electrode capacitance is decreased, the operational frequency band can be widened. In other words, when compared with the optical switch presented in Patent Document 1, the switching operation of the optical switch shown in FIG. 2 can be performed at high speed.

Although FIG. 2 shows an exemplary structure in which electrodes 105 are arranged perpendicular to the traveling direction of incident light, electrodes 105 may be arranged in the same direction as the traveling direction of incident light.

In the following, with reference to drawings, the present invention will be described based on the foregoing optical switch.

FIRST EMBODIMENT

Figure 4:
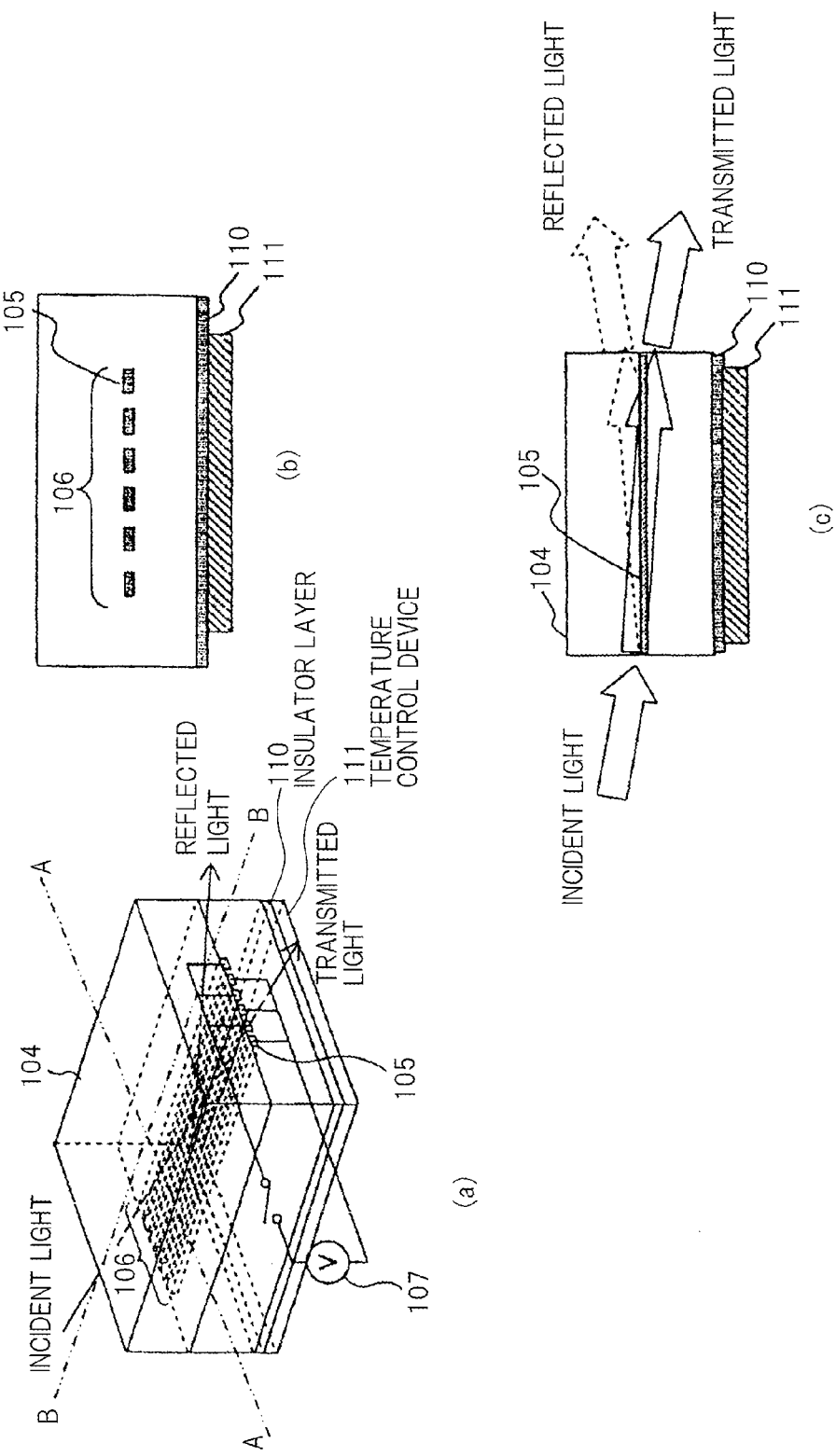
FIG. 4 shows a structure of an optical switch according to a first embodiment: (a) of the drawing is a perspective view; (b) of the drawing is a sectional view taken along line A-A of the optical switch shown in FIG. 4(a); (c) of the drawing is a sectional view taken along line B-B of the optical switch shown in FIG. 4(a).

FIG. 4 shows a structure of an optical switch according to a first embodiment: (a) is a perspective view of the drawing; (b) is a sectional view of the drawing taken along line A-A of the optical switch shown in FIG. 4(a); (c) is a sectional view of the drawing taken along line B-B of the optical switch shown in FIG. 4(a).

The optical switch according to the first embodiment has the same structure as the optical switch shown in FIG. 2 except that temperature control device 111 is formed through insulator layer 110 on a lower plane of electro-optical crystal 104, the lower plane being parallel with electrode section 106. FIGS. 4(a) to (c) show an exemplary structure in which electrodes 105 are arranged in the same direction as the traveling direction of incident light.

As described above, when the refractive index of electro-optical crystal 104 is changed according to an electric field applied thereon, the refractive index changes depending on the temperature of the crystal. When the magnitude of change of the refractive index fluctuates as the temperature changes, the intensity of output light of the optical switch also changes. Thus, to stabilize the operation of the optical switch, the temperatures at which the refractive index changes in electro-optical crystal 104 need to be maintained in a proper range.

Since the optical switch shown in FIG. 2 has the structure in which electrode section 106 is formed on an optical path of incident light, when electrode section 106 is irradiated with light, the temperature of electrode section 106 tends to rise. When the temperature of electro-optical crystal 104 in the proximity of electrode section 106 changes as the temperature of electrode section 106 rises, the refractive index corresponding to the applied voltage also changes and thereby it becomes difficult to maintain the flatness of the refractive index interface of refractive index change section 108. Thus, in the optical switch shown in FIG. 2, it is preferred that the temperatures of electrode section 106 and electro-optical crystal 104 formed in the proximity thereof be maintained constant.

Thus, in the optical switch according to the first embodiment, temperature control device 111 is formed on a plane of electro-optical crystal 104, the plane being closest to electrode section 106 that is formed on the optical path of incident light and whose characteristic fluctuates the most as the temperature changes.

Temperature control device 111 is a thermoelectric transducer such as a Peltier device that serves to control the temperature of electrode section 106 or a heat dissipating device such as a heat sink that serves to dissipate heat generated in electrode section 106.

When temperature control device 111 is a thermoelectric transducer, a temperature sensor is attached to the optical switch so as to detect the temperature in the electrode forming region including electrode section 106 and refractive index change section 108.

When a current is supplied from a current source (not shown) to the thermoelectric transducer, it generates heat. When the thermoelectric transducer generates heat, thermal energy causes insulator layer 110 to heat and thereby the temperature of the electrode forming region rises. Another type of thermoelectric transducer is provided with a heat absorption function that absorbs thermal energy from its contacting member. For example, when a DC current is caused to flow in the foregoing Peltier device, its one plane generates heat and the other plane absorbs it. In addition, when the direction of a current that flows in the Peltier device is inverted, the heat generation plane and the heat absorption plane are inverted to each other. Thus, when the thermoelectric transducer is a Peltier device, the electrode forming region can be heated and cooled.

The temperature sensor is attached to a portion at which the thermal relationship with the electrode forming region is known (for example, a portion where the heat resistance is known). Thus, the temperature of the electrode forming region can be estimated based on the value detected by the temperature sensor.

When the temperature of the electrode forming region is controlled, a predetermined threshold is designated for the detected value of the temperature sensor based on the thermal relationship between the portion at which the temperature sensor is attached and the electrode forming region: if the detected value of the temperature sensor is lower than the threshold, the electrode forming region is heated by the thermoelectric transducer through insulator layer 110; if the detected value of the temperature sensor is equal to or greater than the threshold, the electrode forming region is cooled by the thermoelectric transducer through insulator layer 110. Such a process can maintain the temperature of the electrode forming region within a predetermined temperature range.

If the temperature of the electrode forming region does not need to be controlled with high accuracy, a heat dissipating device such as a heat sink may be used for temperature control device 111 so as to effectively dissipate heat generated in electrode section 106 that has been irradiated with high intensity light.

When the temperature of the electrode forming region is controlled, it is preferred that temperature control device 111 be formed as close to electrode section 106 as possible. Thus, it can be contemplated that temperature control device 111 is directly formed on a plane of electro-optical crystal 104, the plane being in parallel with electrode section 106.

However, since such a structure causes electro-optical crystal 104 having a high dielectric constant to be sandwiched by electrode section 106 and by temperature control device 111 composed of a heat sink or Peltier device that is a conductor, electrode section 106 and temperature control device 111 form a capacitor. Thus, the capacitance component of the capacitor restricts the operation speed (bandwidth) of the optical switch.

Thus, this embodiment has a structure in which insulator layer 110 made of an insulator having a lower dielectric constant than electro-optical crystal 104 is formed on a lower plane of electro-optical crystal 104, the lower plane being parallel with electrode section 106, and temperature control device 111 is formed in contact with insulator layer 110. Thus, the temperature of electrode section 106 can be controlled to be as close as possible to the temperature of electrode sections 106 without it being necessary to increase the capacitance component, or the temperature can be controlled so that heat generated in electrode sections 106 can be dissipated.

Insulator layer 110 may be made of $SiO_2$, SiN, a graphite sheet, a silicone, a low-k (low dielectric constant) material for semiconductor devices (organic polymer, SiOC, etc), or the like. When insulator layer 110 is made of $SiO_2$, SiN, or the like, insulator layer 110 can be formed using an existing production facility for semiconductor devices.

On the other hand, when insulator layer 110 is made of a graphite sheet, a silicone, a low-k (low dielectric constant) material for semiconductor devices (organic polymer, SiOC, etc), or the like, since insulator layer 110 functions as a light absorption layer that absorbs light, insulator layer 110 absorbs light emitted from the relevant plane of electro-optical crystal 104. Thus, effects in which stray light that occurs in electro-optical crystal 104 decreases and in which the extinction ratio of the optical switch improves can be obtained.

Since the optical switch according to this embodiment has a structure in which temperature control device 111 is formed on a plane of the electro-optical crystal, the plane being in parallel with electrode section 106 and being closest to electrode section 106 whose characteristics fluctuate the most as the temperature changes, the temperature in the proximity of electrode section 106 can be evenly and effectively controlled or heat in the proximity of electrode section 106 can be evenly and effectively dissipated. Thus, the direction of reflected light becomes stable as the temperature of refractive index change section 108 fluctuates and thereby the operation of the optical switch becomes stable.

In addition, since the direction of reflected light becomes stable, stray light that occurs in electro-optical crystal 104 decreases and also the extinction ratio of the optical switch improves. Moreover, since the temperature of electrode section 106 does not excessively rise, damage to electrode section 106 is prevented and thereby the reliability of the optical switch improves.

Moreover, since temperature control device 111 is formed through insulator layer 110 having a lower dielectric constant than electro-optical crystal 104, the capacitance component increase slightly and thereby the restriction of the operation speed (bandwidth) of the optical switch is alleviated.

Furthermore, since the relevant plane of electro-optical crystal 104 is covered with temperature control device 111 that is a heat sink, a Peltier device, or the like, the durability of the optical switch against shock improves.

SECOND EMBODIMENT

Figure 5:
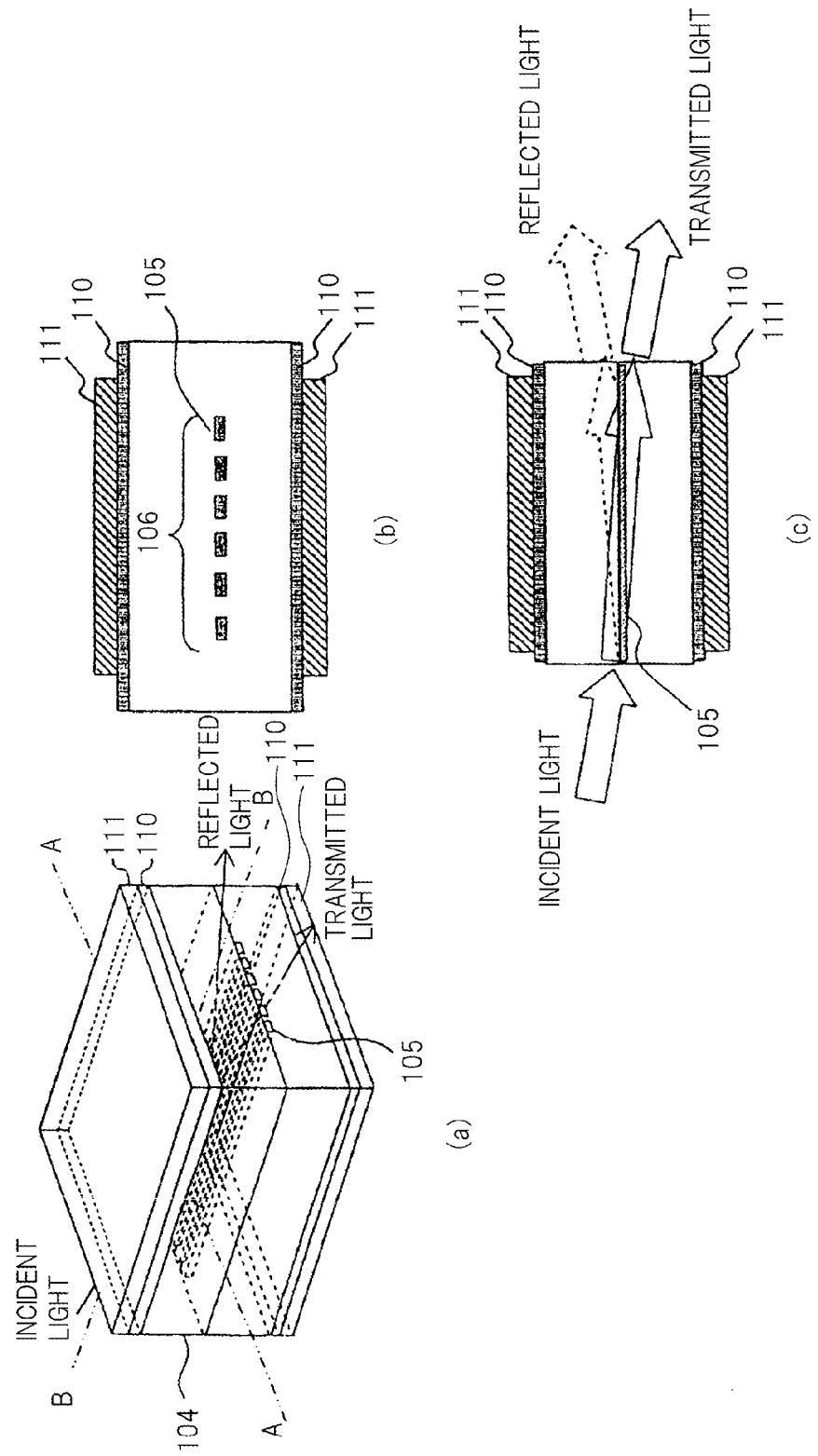
FIG. 5 shows a structure of an optical switch according to a second embodiment: (a) is a perspective view of the drawing; (b) is a sectional view of the drawing taken along line A-A of the optical switch shown in FIG. 5(a); (c) is a sectional view of the drawing taken along line B-B of the optical switch shown in FIG. 5(a).
Figure 6:
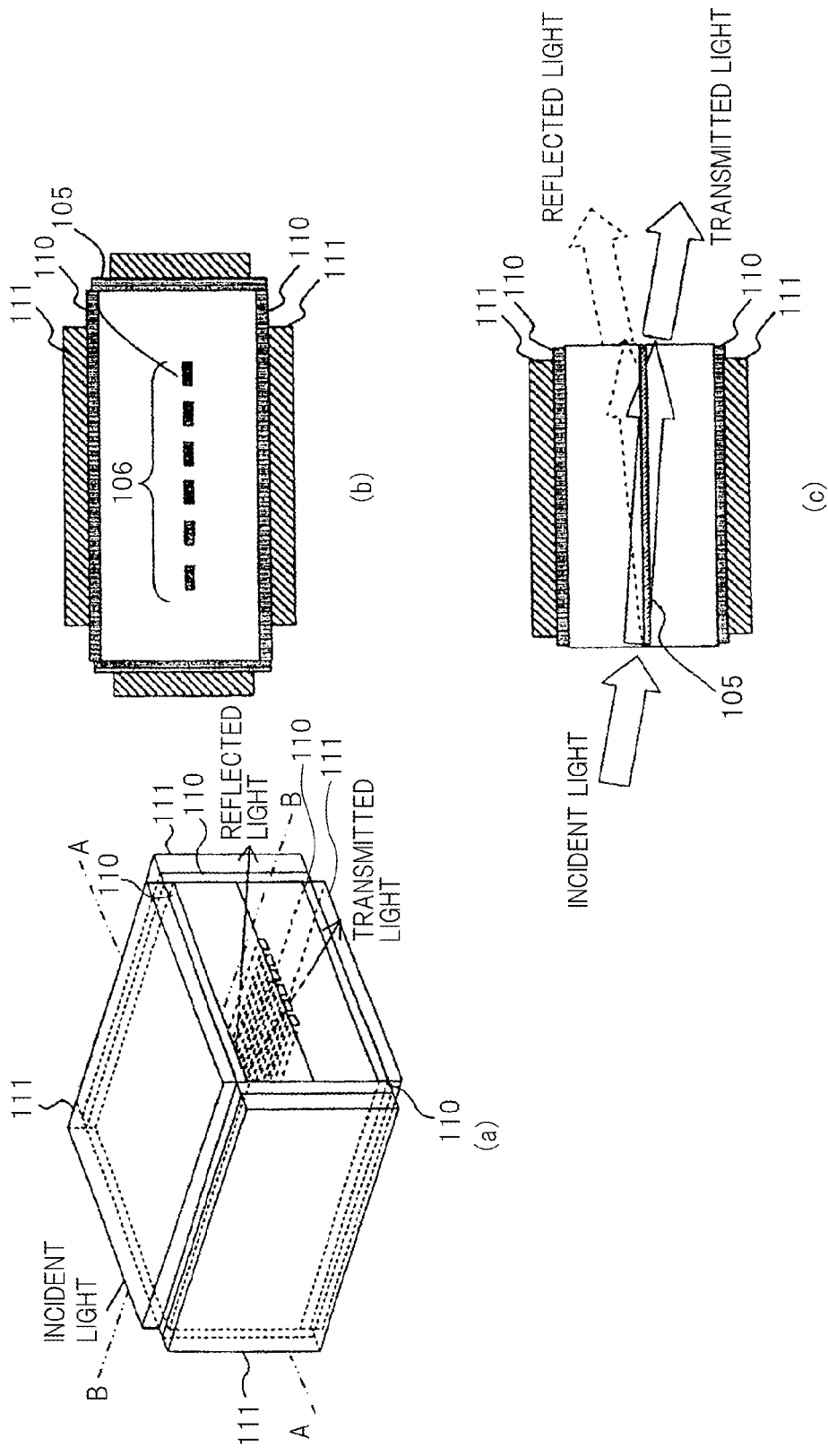
FIG. 6 shows a structure of an exemplified modification of the optical switch according to the second embodiment: (a) is a perspective view of the drawing; (b) is a sectional view of the drawing taken along line A-A of the optical switch shown in FIG. 6(a); (c) is a sectional view of the drawing taken along line B-B of the optical switch shown in FIG. 6(a).

FIG. 5 shows a structure of an optical switch according to a second embodiment: (a) is a perspective view of the drawing; (b) is a sectional view of the drawing taken along line A-A of the optical switch shown in FIG. 5(a); (c) is a sectional view of the drawing taken along line B-B of the optical switch shown in FIG. 5(a). FIG. 6 shows a structure of an exemplified modification of the optical switch according to the second embodiment: (a) is a perspective view of the drawing; (b) is a sectional view of the drawing taken along line A-A of the optical switch shown in FIG. 6(a); (c) is a sectional view of the drawing taken along line B-B of the optical switch shown in FIG. 6(a).

As shown in FIGS. 5(a) to 5(c), the optical switch according to the second embodiment has the same structure as the optical switch shown in FIG. 2 except that temperature control devices 111 are formed respectively through insulation layers 110 on a lower plane and an upper plane of electro-optical crystal 104, the lower and upper planes being in parallel with electrode section 106. Insulation layers 110 and temperature control devices 111 can be made of the same material as those in the first embodiment.

When temperature control devices 111 are formed respectively on the lower plane and upper plane of electro-optical crystal 104 through insulation layers 110, the lower and upper planes being in parallel with electrode section 106, the temperature in the proximity of electrode section 106 can become more stable than that of the optical switch according to the first embodiment.

Alternatively, as shown in FIGS. 6(a) to (c), the optical switch according to the second embodiment may have a structure in which temperature control devices 111 are formed respectively through insulation layers 110 on all planes of electro-optical crystal 104 other than a light incident plane and a light exit plane.

As shown in FIGS. 6(a) to 6(c), when temperature control devices 111 are formed respectively through insulation layers 110 on all the planes of electro-optical crystal 104 other than the light incident plane and the light exit plane, the temperature in the proximity of electrode section 106 can become more stable than that of the optical switch shown in FIGS. 5(a) to 5(c).

In addition, when all the planes of electro-optical crystal 104 other than the light incident plane and the light exit plane through which light is transmitted are covered respectively with insulation layers 110, stray light that occurs in electro-optical crystal 104 decreases and the extinction ratio of the optical switch improves more significantly than that of the first embodiment. Moreover, since the temperature of electrode section 106 does not excessively rise, damage to electrode section 106 is prevented and thereby the reliability of the optical switch improves.

In particular, when insulator layers 110 are made of a graphite sheet, silicone, a low-k (low dielectric constant) material for semiconductor devices (organic polymer type, SiO, etc.), or the like and insulation layer 110 is also formed, for example, on the light exit plane from which reflected light exits, since insulation layer 110 also functions as a light absorption layer, reflection of unnecessary light on the light exit plane decreases. Thus, if transmitted light is used as output light of the optical switch, when insulator layer 110 is also formed on the exit plane of reflected light, since insulator layer 110 absorbs the exited light, stray light that occurs in the electro-optical crystal decreases and thereby the extinction ratio of the optical switch improves. This effect can improve further when insulator layer 110 is formed after a known anti reflection coat is formed on the light exit plane.

When all planes of electro-optical crystal 104 other than the light incident plane and the light exit plane from which light that has passed through the electrode section exits are covered respectively with temperature control devices 111 made of a temperature controlling heat sink or Peltier device, the durability of the optical switch against shock improves more significantly than that of the first embodiment.

Alternatively, when most of the planes of electro-optical crystal 104 are covered respectively with temperature control devices 111, they can have an electromagnetic shielding effect. Thus, malfunction of the optical switch due to radio frequency noise and so forth decreases.

THIRD EMBODIMENT

Figure 7:
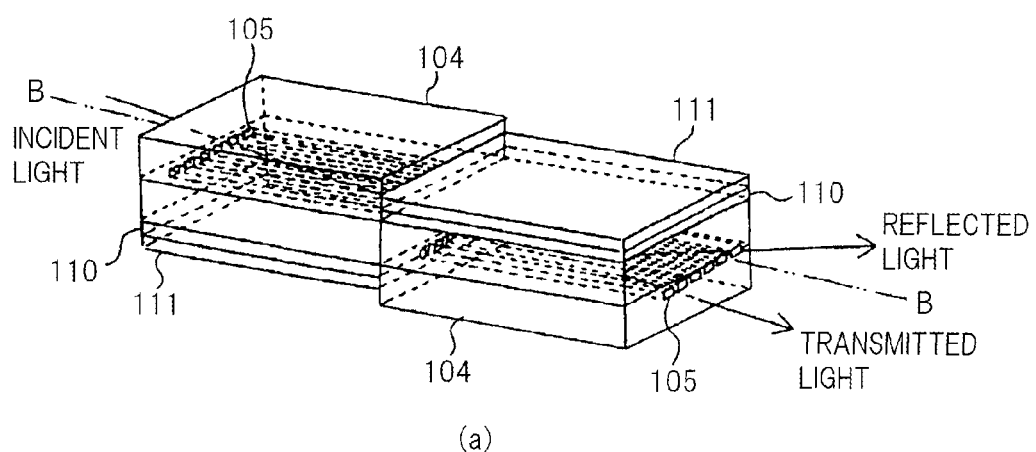
FIG. 7 shows a structure of an optical switch according to a third embodiment: (a) is a perspective view of the drawing; (b) is a sectional view of the drawing taken along line B-B of the optical switch shown in FIG. 7(a).
Figure 7:
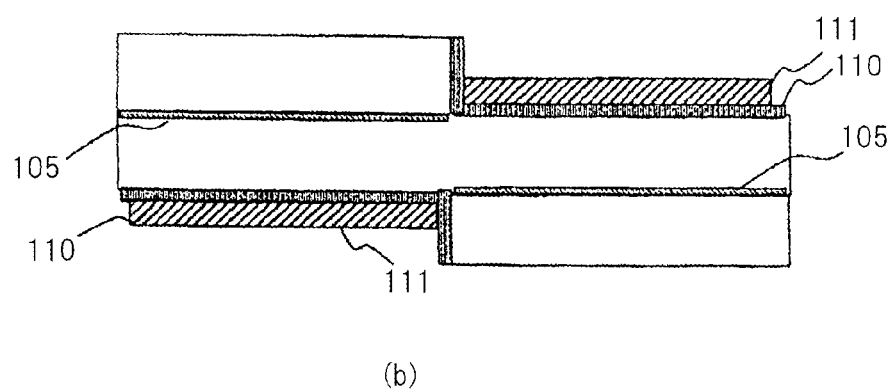

FIG. 7 shows a structure of an optical switch according to a third embodiment: (a) is a perspective view of the drawing; (b) is a sectional view of the drawing taken along line B-B of the optical switch shown in FIG. 7(a).

As shown in FIGS. 7(a) and (b), the optical switch according to the third embodiment has a structure in which a plurality of stages of electrode sections 106 (in FIGS. 7(a), (b), two stages are exemplified) are arranged on an optical path of incident light. Electrode planes composed of electrodes 105 of electrode sections 106 are arranged in parallel with each other.

When the optical switch as shown in FIGS. 7(a), (b) has a structure in which electrode section 106 that incident light reaches first reflects the incident light and the later stage of electrode section 106 reflects light that passes through the preceding stage of electrode section 106, the intensity of light that is not reflected by each of electrode sections 106, but that passes through each of electrode sections 106, and that exits from the light exit plane can be decreased. Thus, the optical switch that is provided with a plurality of stages of electrode sections 106 as shown in FIGS. 7(a), (b) can improve the extinction ratio more significantly than the optical switch according to the first embodiment.

The third embodiment has a structure in which temperature control devices 111 are formed respectively through insulation layers 110 on the lower plane and the upper plane of electro-optical crystal 104, the lower and upper planes being parallel with electrode sections 106. Insulation layers 110 and temperature control devices 111 can be made of the same materials as those of the first embodiment.

Such a structure, like the first embodiment, allows the temperatures in the proximity of electrode sections 106 to become stable, the operation of the optical switch becomes stable and reliability thereof improves.

In addition, since the direction of the reflected light becomes stable, stray light that occurs in electro-optical crystal 104 decreases and thereby the extinction ratio of the optical switch improves.

Moreover, since temperature control devices 111 are formed respectively through insulator layers 110 having a lower dielectric constant than electro-optical crystal 104, the capacitance component increase slightly and thereby the restriction of the operation speed (bandwidth) of the optical switch is alleviated.

Furthermore, since the relevant planes of electro-optical crystal 104 are covered respectively with temperature control devices 111 each of which is a heat sink, a Peltier device, or the like, durability of the optical switch against shock improves.

Figure 8:
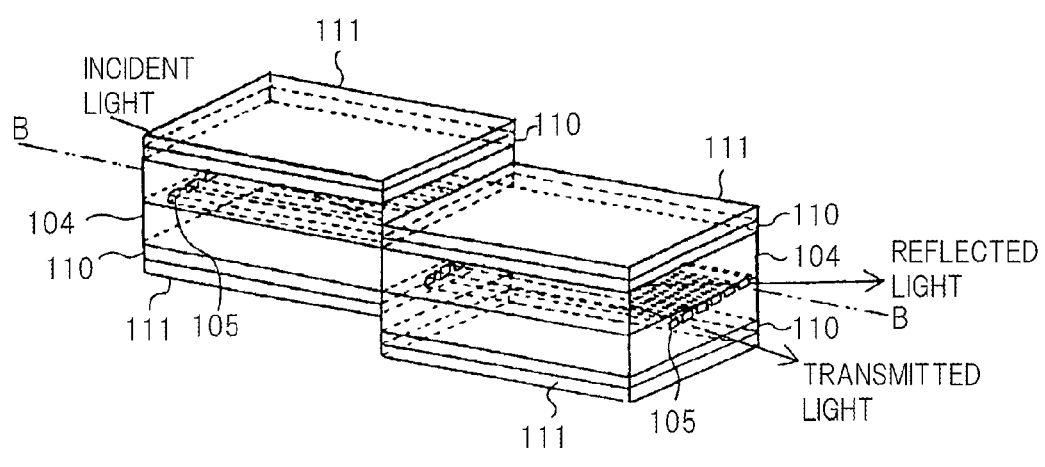
FIG. 8 shows a structure of an exemplified modification of the optical switch according to the third embodiment: (a) is a perspective view of the drawing; (b) is a sectional view of the drawing taken along line B-B of the optical switch shown in FIG. 8(a).
Figure 8:
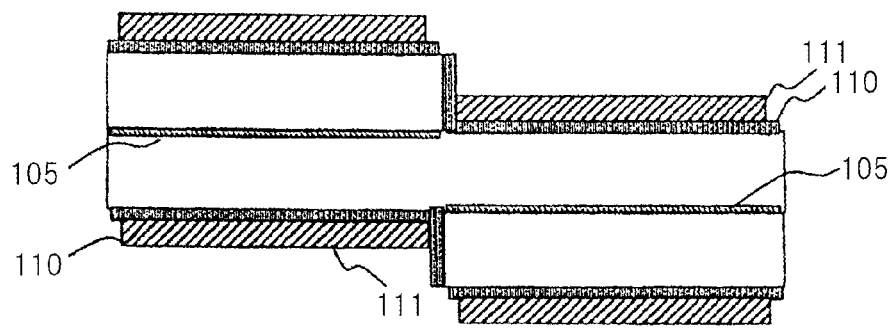

Although FIGS. 7(a), (b) show an exemplified structure in which temperature control devices 111 are formed respectively through insulation layers 110 on the lower plane or upper plane of electro-optical crystal 104, the lower plane or upper plane corresponding to electrode sections 106, as shown in FIGS. 8(a), (b), temperature control devices 111 may be formed respectively through insulation layers 110 on the lower plane and upper plane of electro-optical crystal 104, the lower and upper planes being parallel with electrode sections 106.

Alternatively, in the structure where electrode sections 106 are arranged on the optical path of the incident light shown in FIGS. 7(a), (b), like the optical switch (second embodiment) shown in FIGS. 6(a), (b), temperature control devices 111 may be formed respectively through insulation layers 110 on all the planes of electro-optical crystal 104 other than the light incident plane and the light exit plane.

When the planes of electro-optical crystal 104 other than the light incident plane and the light exit plane are covered respectively with temperature control devices 111 through insulation layers 110, the durability of the optical switch against shock or the like improves and malfunction of the optical switch due to radio frequency noise or the like decreases.

In particular, when insulator layers 110 are made of a graphite sheet, silicone, a low-k (low dielectric constant) material for semiconductor devices (organic polymer type, SiO, etc.), or the like and when insulation layer 110 is also formed, for example, on the light exit plane from which reflected light exits, since insulation layer 110 also functions as a light absorption layer, reflection of unnecessary light on the light exit plane decreases. Thus, if transmitted light is used as output light of the optical switch, when insulator layer 110 is also formed on the exit plane of reflected light, since insulator layer 110 absorbs the exited light, stray light that occurs in the electro-optical crystal decreases and thereby the extinction ratio of the optical switch improves. This effect can further improve when insulator layer 110 is formed after a known anti reflection coat is formed on the light exit plane.

FOURTH EMBODIMENT

Figure 9:
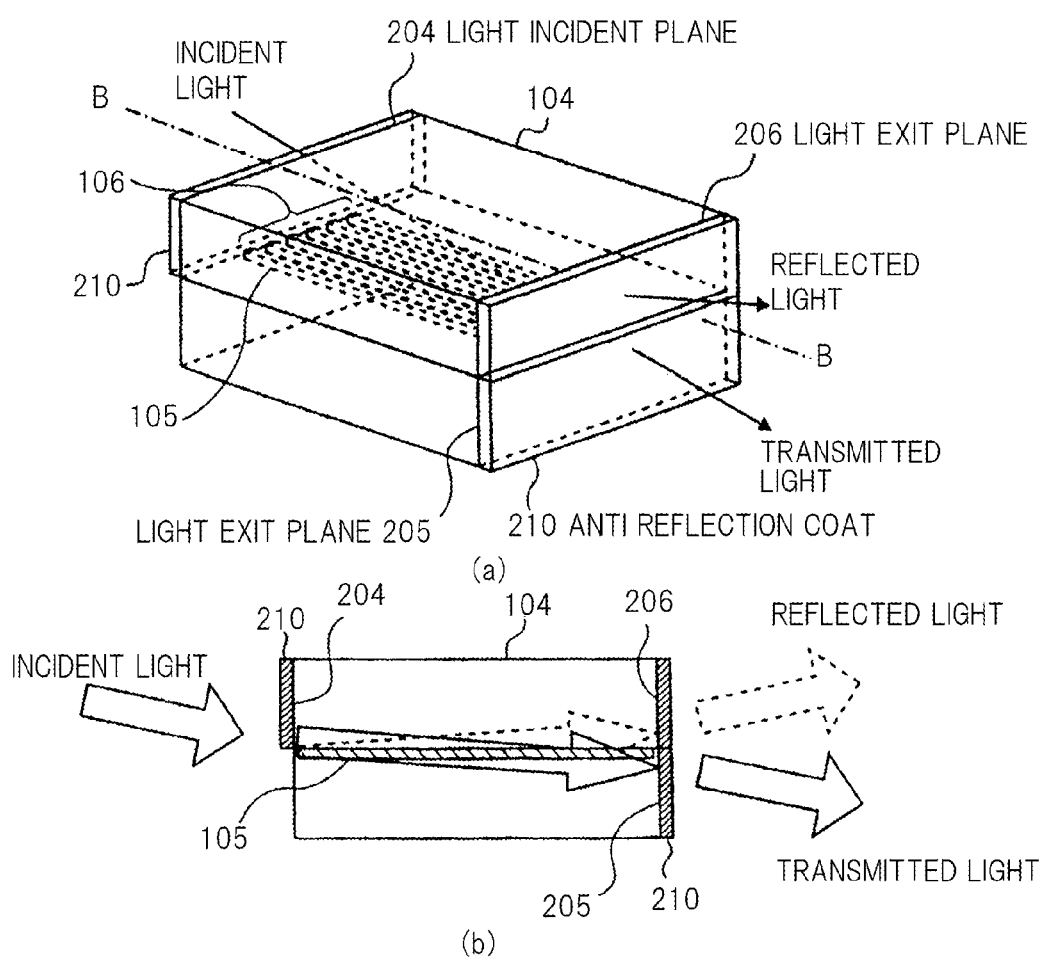
FIG. 9 shows a structure of an optical switch according to a fourth embodiment: (a) is a perspective view of the drawing; (b) is a sectional view of the drawing taken along line B-B of the optical switch shown in FIG. 9(a).

FIG. 9 shows a structure of an optical switch according to a fourth embodiment: (a) is a perspective view of the drawing; (b) is a sectional view of the drawing taken along line B-B of the optical switch shown in FIG. 9(a).

The optical switch according to the fourth embodiment has the same structure as the optical switch shown in FIG. 2 except that anti reflection coats 210 are formed respectively on light incident plane 204 to which light enters and light exit plane 205 from which transmitted light exits.

Anti reflection coats 210 may be of any material, any film thickness, any film composition (regardless of single layer film or multi layer film), and so forth and may be formed using a known technique as long as they have an anti reflection effect against light having a predetermined wavelength.

When the optical switch has the structure in which anti reflection coats 210 are formed respectively on light incident plane 204 and light exit plane 205 from which transmitted light exits, unnecessary reflected light on light incident plane 204 and light exit plane 205 decreases. Thus, when transmitted light is used, for example, as a light output of the optical switch, since the use efficiency of the transmitted light increases, the extinction ratio of the optical switch improves.

Alternatively, the optical switch according to the fourth embodiment may have a structure in which anti reflection coat 210 is also formed on light exit plane 206 from which reflected light exits. FIGS. 9(a), (b) show an exemplified structure in which anti reflection coats 210 are formed respectively on light exit planes 205, 206.

When anti reflection coat 210 is also formed on light exit plane 206 from which reflected light exits, unnecessary reflected light on light exit plane 206 decreases. Thus, when transmitted light is used, for example, as light output of the optical switch, since light can easily exit from light exit plane 206 to the outside, stray light that occurs in electro-optical crystal 104 decreases and the extinction ratio of the optical switch improves.

Although the above description exemplifies that transmitted light is used as a light output of the optical switch, reflected light can be used as light output of the optical switch.

When the optical switch operates, since light reflects mostly on light incident plane 204 through which light passes and on light exit planes 205, 206, if anti reflection coats 210 are formed respectively on light incident plane 204 and light exit planes 205, 206, stray light can be decreased most effectively with the least amount of material.

Alternatively, anti reflection coats 210 may be formed respectively on other planes of electro-optical crystal 104 as well as light incident plane 204 and light exit planes 205, 206. In this case, since reflections of light on planes other than light incident plane 204 and light exit planes 205, 206 decrease, stray light in electro-optical crystal 104 decreases more significantly and thereby the extinction ratio of the optical switch further improves.

Since the optical switches shown in FIG. 2 and FIGS. 9(*a*), (*b*) have the structures in which light exit planes are switched depending on whether a voltage is applied to electrode section 106, when exit light is to be turned on/off, any one of two exit lights needs to be extinguished by a light absorber or the like that is formed for example outside.

Figure 10:
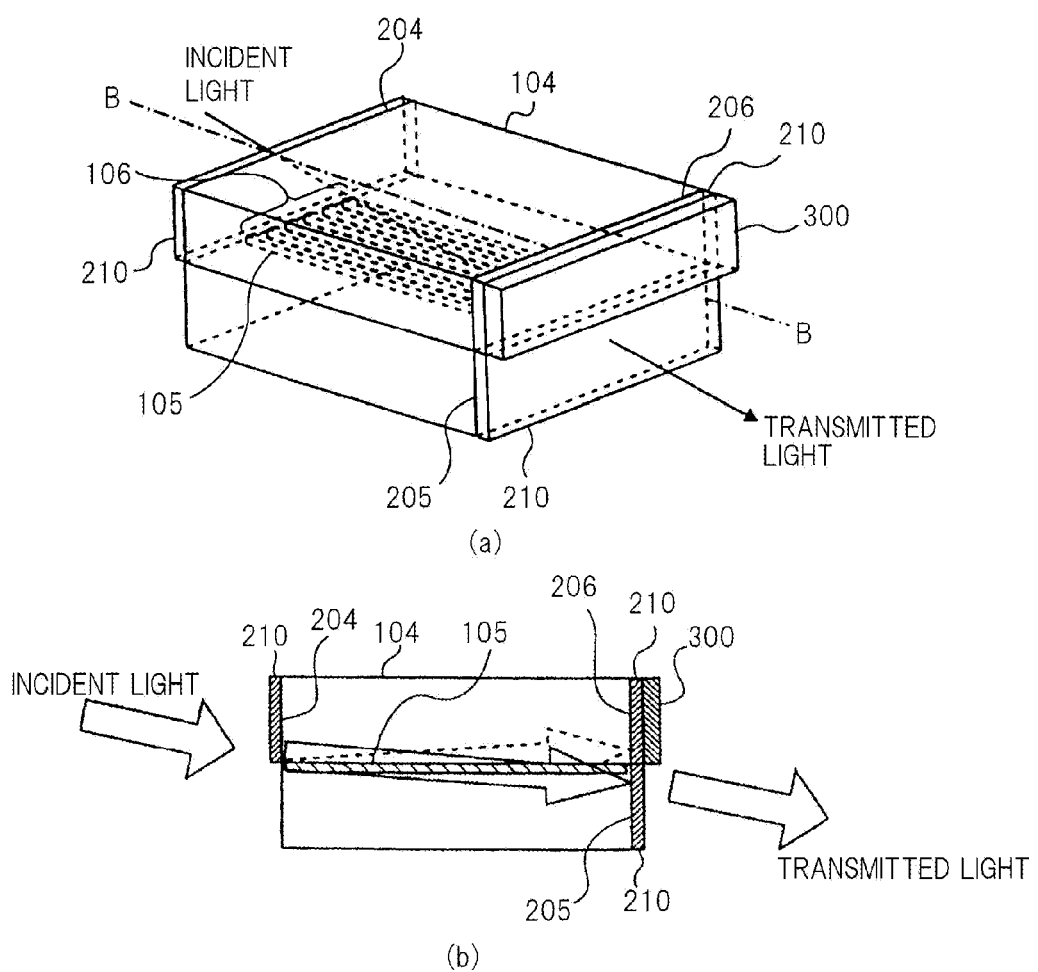
FIG. 10 shows a structure of an exemplified modification of the optical switch according to the fourth embodiment: (a) is a perspective view of the drawing; (b) is a sectional view of the drawing taken along line B-B of the optical switch shown in FIG. 10(a).

As shown in FIGS. 10(*a*), (*b*), the optical switch according to this embodiment may have a structure in which light absorption layer 300 is formed on a plane from which unused light exits, for example, light exit plane 206 that light reflected by electrode section 106 (reflected light) reaches. Light absorption layer 300 can be made of a material that easily absorbs light, for example, a graphite sheet or the like.

When the optical switch has a structure in which light absorption layer 300 is formed on the light exit plane, since the optical switch does not need to be provided with an external light absorber, it can be easily built in an optical module or the like. In addition, since an optical module or the like does not need to be provided with a light absorber, the entire device including the optical switch according to this embodiment can be miniaturized.

Alternatively, light absorption layers 300 may be formed respectively on other planes of electro-optical crystal 104 as well as any one of light exit planes 205 and 206 other than light incident plane 204. In this case, since light scattered by electrode section 106 reaches planes other than light incident plane 204 and light exit planes 205, 206, light that exits to the outside of the crystal is absorbed by the light absorption layer and thereby stray light that occurs in electro-optical crystal 104 decreases more significantly. Thus, the extinction ratio of the optical switch can be further improved. In addition, since the optical switch does not need to be provided with a light absorber outside the crystal, the optical switch device can be easily miniaturized and can be easily built in equipment.

When light absorption layer 300 is made of a material having a high thermal conductivity such as a graphite sheet or a silicone and a temperature control device such as a Peltier device or the like is formed on light absorption layer 300, the temperature of electro-optical crystal 104 can be effectively controlled.

Next, the degree of effect that can be obtained with the optical switch according to this embodiment will be described.

In the following, the case in which the transmitted light shown in FIG. 2 is light output of the optical switch will be considered.

When the optical switch has a structure in which anti reflection coats 210 are not formed respectively on light incident plane 204 and light exit plane 205 from which transmitted light exits, light of around 5% reflects on these planes. Thus, when electrode section 106 that transmits 70% of the intensity of incident light is formed, the use efficiency of light of the optical switch amounts to around 63%.

In contrast, when the optical switch according to this embodiment has a structure in which anti reflection coats 210 are formed respectively on light incident plane 204 and light exit plane 205 from which transmitted light exits, light that reflects on these planes can be suppressed to around 1%.

Thus, the use efficiency of light of the optical switch according to this embodiment amounts to 68% or greater.

FIFTH EMBODIMENT

Figure 11:
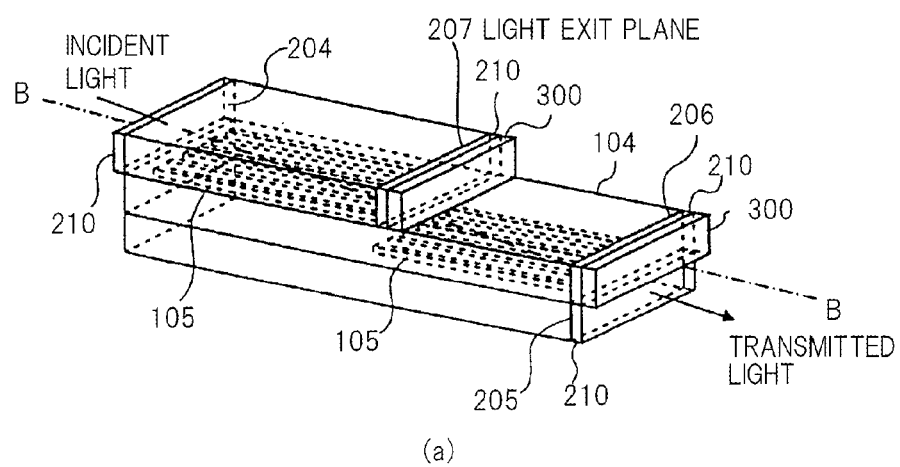
FIG. 11 shows a structure of an optical switch according to a fifth embodiment: (a) is a perspective view of the drawing; (b) is a sectional view of the drawing taken along line B-B of the optical switch shown in FIG. 11(a).
Figure 11:
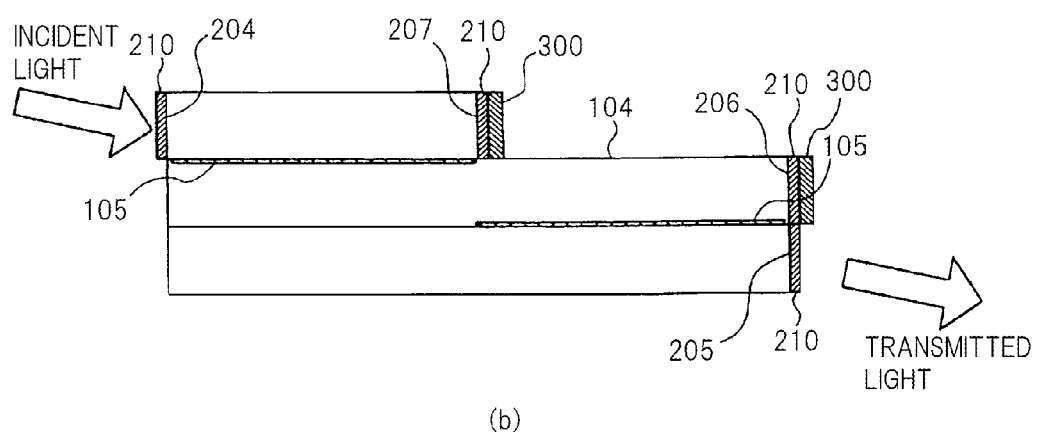

FIG. 11 shows a structure of an optical switch according to a fifth embodiment: (a) is a perspective view of the drawing; (b) is a sectional view of the drawing taken along line B-B of the optical switch shown in FIG. 11(*a*).

As shown in FIGS. 11(*a*), (*b*), the optical switch according to the fifth embodiment has a structure in which a plurality of stages of electrode sections 106 (in FIGS. 11(*a*), (*b*), two stages are exemplified) are arranged on an optical path of incident light.

Figure 1:
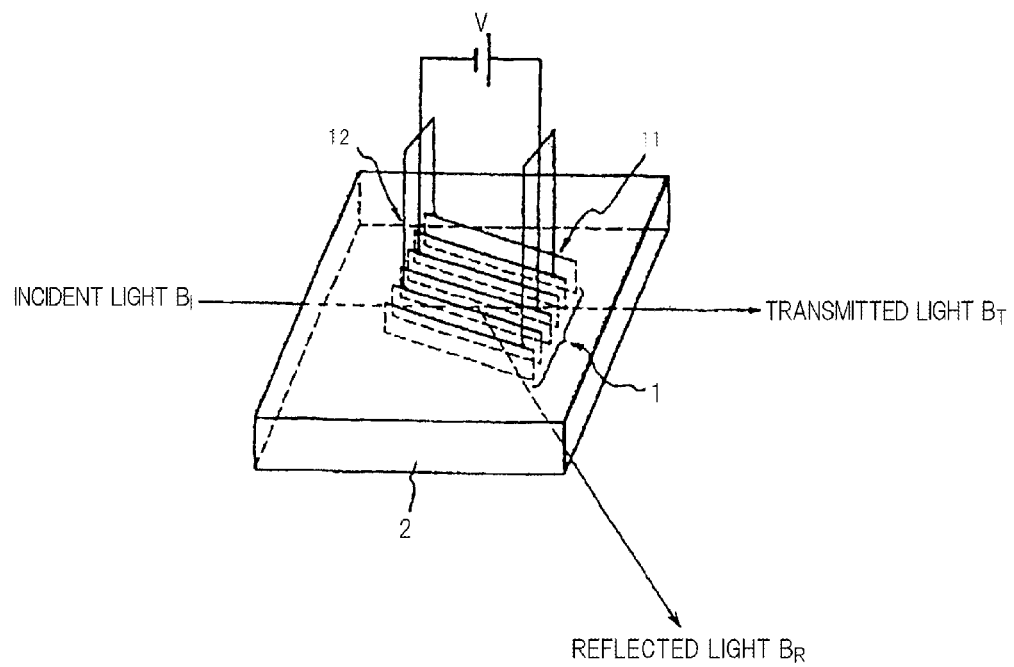
FIG. 1 is a perspective view showing a structure of an optical switch according to a related art reference.

When the optical switch as shown in FIGS. 11(*a*), (*b*) has a structure in which electrode section 106 that incident light reaches first reflects the incident light and the later stage of electrode section 106 reflects light that passes through the preceding stage of electrode section 106, the intensity of light that is not reflected by each of electrode sections 106, but that passes through each of electrode sections 106, and that exits from the light exit plane can be decreased. Thus, the optical switch that is provided with a plurality of stages of electrode sections 106 as shown in FIGS. 11(*a*), (*b*) can improve the extinction ratio more significantly than the optical switch shown in FIG. 1.

In addition to the plurality of stages of electrode sections 106, the optical switch according to the fifth embodiment has a structure in which anti reflection coats 210 are formed on light incident plane 204 and light exit planes 205, 206, 207.

In such a structure, since unnecessary reflections on light incident plane 204 and light exit planes 205, 206, 207 decrease, the use efficiency of transmitted light increases, and reflected light on these planes tends to exit to the outside, then stray light that occurs in the electro-optical crystal decreases and thereby the extinction ratio of the optical switch further improves.

Like the fourth embodiment, the optical switch according to the fifth embodiment may have a structure in which anti reflection coats 210 are formed respectively on other planes of electro-optical crystal 104 as well as light incident plane 204 and light exit planes 205, 206, 207. In this case, since reflections of light on planes other than light incident plane 204 and light exit planes 205, 206, 207 decrease, stray light in electro-optical crystal 104 decreases more significantly and thereby the extinction ratio of the optical switch further improves.

Like the fourth embodiment, the optical switch according to the fifth embodiment may have a structure in which light absorption layers 300 are formed respectively on planes from which unused light exits, for example, light exit planes 206, 207 that light reflected on electrode sections 106 reaches (reflected light). FIGS. 11(*a*), (*b*) show an exemplified structure in which light absorption layers 300 are formed respectively on light exit planes 206, 207. Such a structure does not need to be provided with an external light absorber, it can be easily built in an optical module or the like. In addition, since an optical module or the like does not need to be provided with a light absorber, the entire device including the optical switch according to this embodiment can be miniaturized.

Like the fourth embodiment, when the optical switch according to the fifth embodiment has a structure in which light absorption layers 300 each are made of a material having a high thermal conductivity such as a graphite sheet or a silicone and temperature control devices such as Peltier devices or the like are formed respectively on light absorption layers 300, the temperature of electro-optical crystal 104 can be effectively controlled.

SIXTH EMBODIMENT

Figure 12:
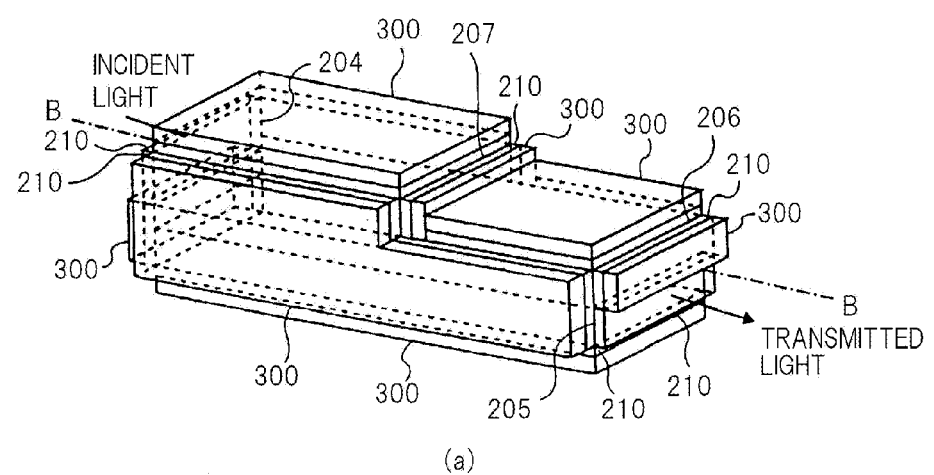
FIG. 12 shows a structure of an optical switch according to a sixth embodiment: (a) is a perspective view of the drawing; (b) is a sectional view of the drawing taken along line B-B of the optical switch shown in FIG. 12(a).
Figure 12:
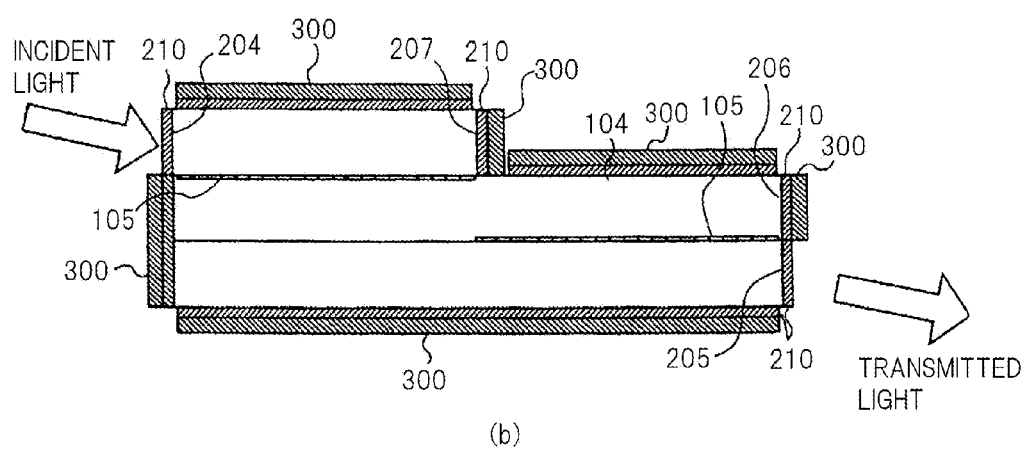

FIG. 12 shows a structure of an optical switch according to a sixth embodiment: (a) is a perspective view of the drawing; (b) is a sectional view of the drawing taken along line B-B of the optical switch shown in FIG. 12(*a*).

Like the optical switch according to the fifth embodiment, as shown in FIGS. 12 (*a*), (b), the optical switch according to the sixth embodiment has a structure in which a plurality of stages of electrode sections 106 (in FIGS. 12[*a*], [*b*], two stages are exemplified) are formed on an optical path of incident light.

In addition to the plurality of stages of electrode sections 106, the optical switch according to the sixth embodiment has a structure in which anti reflection coats 210 are formed respectively on light incident plane 204 and light exit planes 205, 206, 207 and anti reflection coats and light absorption layers 300 are formed respectively on planes of electro-optical crystal 104 other than light incident plane 204 and light exit planes 205, 206, 207.

Like the fourth and fifth embodiments, the optical switch according to the sixth embodiment may have a structure in which light absorption layers 300 are formed respectively on planes from which unused light exits, for example, light exit planes 206, 207 that light reflected on electrode sections 106 (reflected light) reaches. FIGS. 12(*a*), (*b*) show an exemplified structure in which light absorption layers 300 are formed respectively on light exit planes 206, 207.

Like the optical switch according to the fifth embodiment, FIGS. 12(*a*), (*b*) show an exemplified optical switch having a structure in which a plurality of stages of electrode sections 106 are formed on an optical path of incident light; like the optical switch according to the fourth embodiment, when the optical switch according to the sixth embodiment has a structure in which one electrode section 106 is formed on an optical path of incident light, light absorption layers 300 may be formed respectively on planes of electro-optical crystal 104 other than light incident plane 204 and light exit plane 205.

When anti reflection coats 210 and light absorption layers 300 are formed respectively on planes of electro-optical crystal 104 other than light incident plane 204 and light exit planes 205, 206, 207, light that reaches electro-optical crystal 104 due to scattering or the like tends to exit to the outside of the crystal and the exited light is absorbed by light absorption layers 300 and thereby stray light that occurs in electro-optical crystal 104 further decreases. Thus, the optical switch according to the sixth embodiment can improve the extinction ratio more significantly than the optical switches according to the fourth embodiment and fifth embodiment.

When either anti reflection coats 210 or light absorption layers 300 are formed respectively on planes of electro-optical crystal 104 other than light incident plane 204 and light exit planes 205, 206, 207, the effect in which stray light decreases can be obtained; however, when both anti reflection coats 210 and light absorption layers 300 are formed, the highest effect can be obtained and the extinction ratio of the optical switch improves most significantly.

Like the fourth and fifth embodiments, when the optical switch according to the sixth embodiment has a structure in which light absorption layers 300 each are made of a material having a high thermal conductivity such as a graphite sheet or a silicone and temperature control devices such as Peltier devices or the like are formed respectively on light absorption layers 300, the temperature of electro-optical crystal 104 can be effectively controlled.

SEVENTH EMBODIMENT

Figure 13:
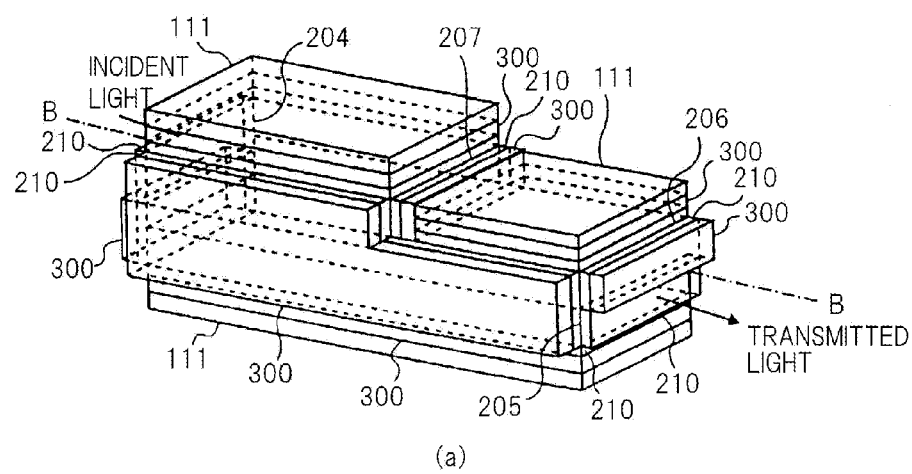
FIG. 13 shows a structure of an optical switch according to a seventh embodiment: (a) is a perspective view of the drawing; (b) is a sectional view of the drawing taken from B-B of the optical switch shown in FIG. 13(a).
Figure 13:
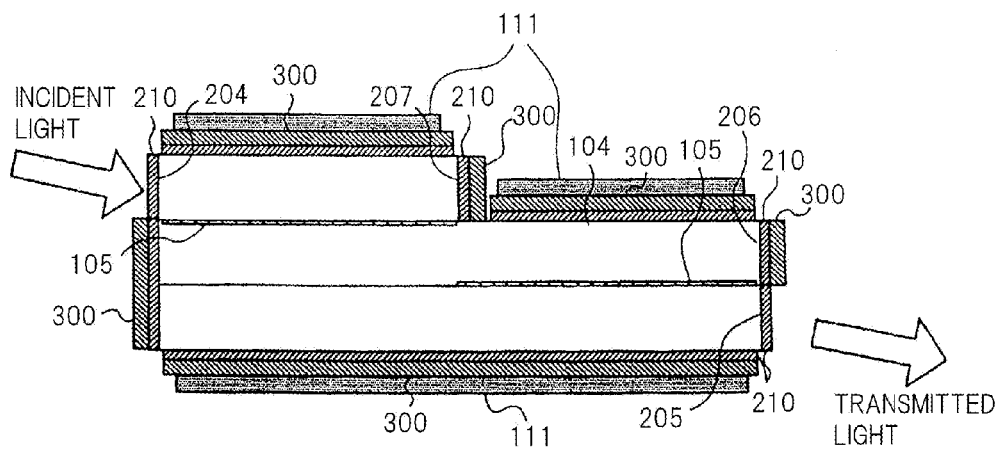

FIG. 13 shows a structure of an optical switch according to a seventh embodiment: (a) is a perspective view of the drawing; (b) is a sectional view of the drawing taken along line B-B of the optical switch shown in FIG. 13(*a*).

Like the optical switches according to the fifth and sixth embodiments, as shown in FIGS. 13(*a*), (*b*), the optical switch according to the seventh embodiment has a structure in which a plurality of states of electrode sections 106 (in FIGS. 13(*a*), (*b*), two stages are exemplified) are formed on an optical path of incident light.

Like the optical switch according to the sixth embodiment, in addition to the plurality of stages of electrode sections 106, the optical switch according to the seventh embodiment has a structure in which anti reflection coats 210 are formed respectively on light incident plane 204 and light exit planes 205, 206, 207 and anti reflection coats 210 and light absorption layers 300 are formed respectively, in particular, on planes of electro-optical crystal 104 other than light incident plane 204 and light exit planes 205, 206, 207, the planes being parallel with electrode sections 106.

Light absorption layers 300 each are made of an insulator having a lower dielectric constant than the electro-optical crystal and temperature control devices 111 are formed in contact with light absorption layers 300 so as to control the temperature of electrode sections 105 or dissipate heat generated in electrode sections 105.

Like the fourth embodiment and fifth embodiment, the optical switch according to this embodiment may have a structure in which light absorption layers 300 are formed on planes from which unused light exits, for example, light exit planes 206, 207 that light reflected by electrode section 106 (reflected light) reaches. FIGS. 13(*a*), (*b*) show an exemplified structure in which light absorption layers 300 are also formed respectively on light exit planes 206, 207.

When anti reflection coats 210 and light absorption layers 300 are formed respectively on planes of electro-optical crystal 104 other than light incident plane 204 and light exit planes 205, 206, 207, light that reaches electro-optical crystal 104 due to scattering or the like tends to exit to the outside of the crystal and the exited light is absorbed by light absorption layers 300 and thereby stray light that occurs in electro-optical crystal 104 further decreases. Thus, the extinction ratio of the optical switch improves.

When either anti reflection coats 210 or light absorption layers 300 are formed respectively on planes of electro-optical crystal 104 other than light incident plane 204 and light exit planes 205, 206, 207, the effect in which stray light decreases can be obtained; however, when both anti reflection coats 210 and light absorption layers 300 are formed, the highest effect can be obtained and the extinction ratio of the optical switch improves most significantly.

In addition to the structure according to the seventh embodiment, as presented in the first to third embodiments, temperature control devices 111 may be also formed respectively on planes of electro-optical crystal 104, the planes being closest to electrode section 106 that is formed on the optical path of the incident light and whose characteristics fluctuate the most as the temperature changes, and each of temperature control devices 111 may be a thermoelectric transducer such as a Peltier device that serves to control the temperature of electrode section 106 or a heat dissipating device such as a heat sink that serves to dissipate heat generated in electrode section 106. When such a structure is used, the temperatures of electrode sections 106 can be controlled to be as close as possible to the temperature of electrode sections 106 without it being necessary to increase the capacitance component, or the temperature can be controlled so that heat generated in electrode sections 106 can be dissipated.

When the refractive index of electro-optical crystal 104 is changed according to an electric field applied thereon, the refractive index generally changes depending on the temperature of the crystal. When the magnitude of change of the refractive index fluctuates as the temperature changes, the intensity of output light of the optical switch also changes. Thus, to stabilize the operation of the optical switch, the temperatures at which the refractive index changes in electro-optical crystal 104 need to be maintained in a proper range.

Since the optical switch according to the seventh embodiment has the structure in which temperature control devices 111 are formed on planes of the electro-optical crystal, the planes being parallel with electrode sections 106 and being closest to electrode sections 106 whose characteristics fluctuate the most as the temperature changes, the temperatures in the proximities of electrode sections 106 can be evenly and effectively controlled or heat in the proximities of electrode sections 106 can be evenly and effectively dissipated. Thus, the direction of reflected light becomes stable as the temperatures of refractive index change sections 108 fluctuate and thereby the operation of the optical switch becomes stable.

In addition, since the direction of reflected light becomes stable, stray light that occurs in electro-optical crystal 104 decreases and also the extinction ratio of the optical switch improves. Moreover, since the temperatures of electrode sections 106 do not excessively rise, they are prevented from being damaged and thereby the reliability of the optical switch improves.

Moreover, since temperature control devices 111 are formed respectively through insulator layers 110 having a lower dielectric constant than electro-optical crystal 104, the capacitance component increases slightly and thereby the restriction of the operation speed (bandwidth) of the optical switch is alleviated.

Furthermore, since the relevant planes of electro-optical crystal 104 are covered with temperature control devices 111 each of which is made of a heat sink, a Peltier device, or the like, the durability of the optical switch against shock improves.

EIGHTH EMBODIMENT

Figure 14:
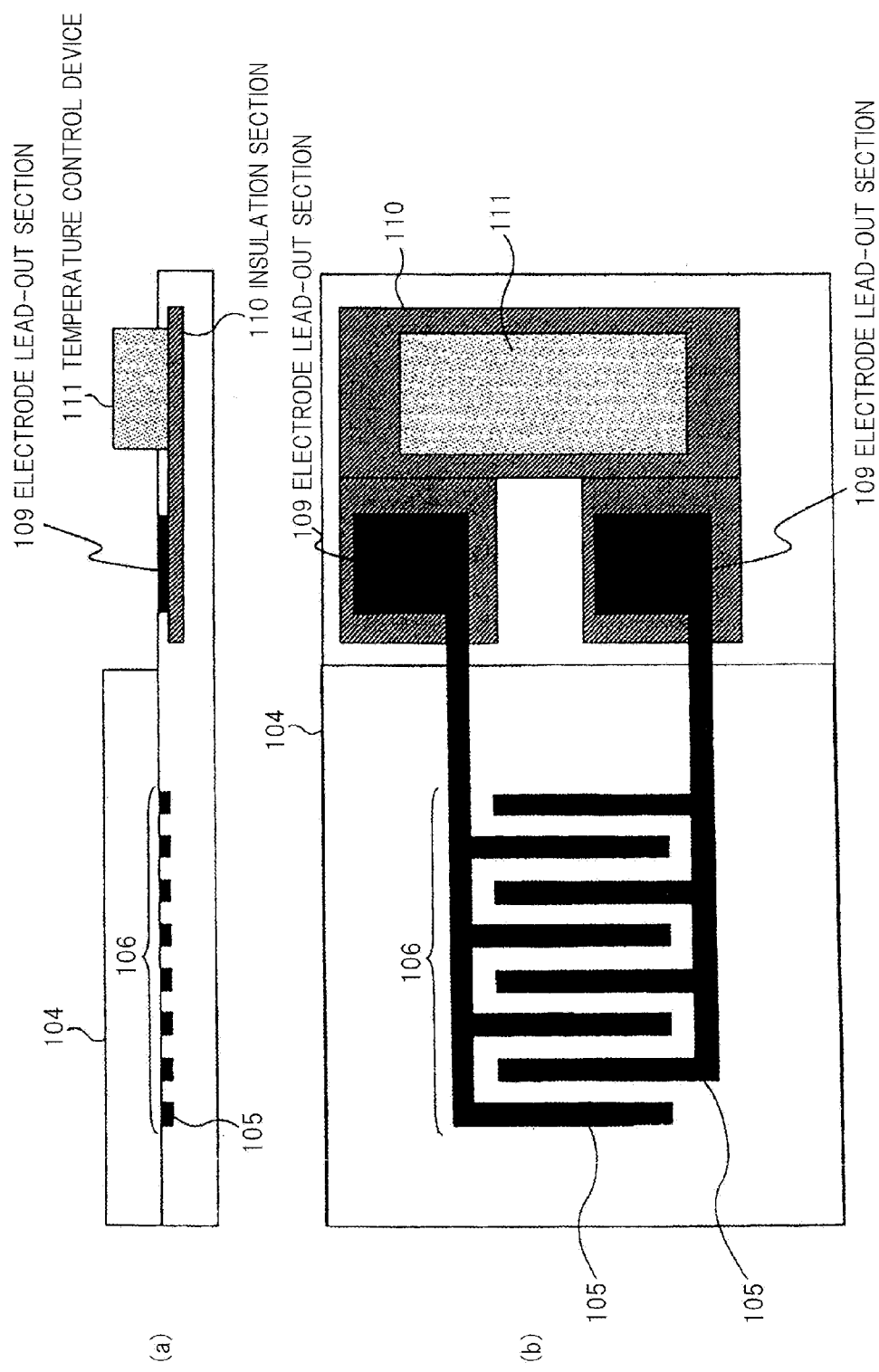
FIG. 14 shows a structure of an optical switch according to an eighth embodiment: (a) is a side sectional view of the drawing; (b) is a plan view of the drawing.

FIG. 14 shows a structure of an optical switch according to an eighth embodiment: (a) is a side section view of the drawing; (b) is a plain view of the drawing.

The optical switch according to the eighth embodiment has the same structure as the optical switch shown in FIG. 2 except that insulation section 110 that has a lower dielectric constant and a higher thermal conductivity than electro-optical crystal 104 is formed in contact with electrode lead-out sections 109 that apply a voltage to each of electrodes 105 from external power supply 107 and temperature control device 111 that controls the temperature of electrode section 106 or dissipates heat generated in electrode section 106 is formed on a plane of insulation section 110.

Temperature control device 111 is a thermoelectric transducer such as a Peltier device that serves to control the temperature of electrode section 106 or a heat dissipating device such as a heat sink that serves to dissipate heat generated in electrode section 106.

When temperature control device 111 is a thermoelectric transducer, a temperature sensor is attached to the optical switch so as to detect the temperature in the electrode forming region including electrode section 106 and refractive index change section 108.

When a current is supplied from a current source (not shown) to the thermoelectric transducer, it generates heat. When the thermoelectric transducer generates heat, the thermal energy causes insulation section 110 to heat, causes electrode section 106 to heat through electrode lead-out sections 109, and thereby causes the temperature of the electrode forming region to rise. Another type of thermoelectric transducer is provided with a heat absorption function that absorbs thermal energy from its contacting member. For example, when a DC current is caused to flow in the foregoing Peltier device, its one plane generates heat and another plane absorbs it. In addition, when the direction of a current that flows in the Peltier device is inverted, the heat generation plane and the heat absorption plane are inverted to each other. Thus, when the thermoelectric transducer is a Peltier device, the electrode forming region can be heated and cooled.

The temperature sensor is attached to a portion at which the thermal relationship with the electrode forming region is known (for example, a portion where the heat resistance is known). Thus, the temperature of the electrode forming region can be estimated based on the value detected by the temperature sensor.

When the temperature of the electrode forming region is controlled, a predetermined threshold is designated for the detected value of the temperature sensor based on the thermal relationship between the portion at which the temperature sensor is attached and the electrode forming region: if the detected value of the temperature sensor is lower than the threshold, the electrode forming region is heated by thermoelectric transducer through insulator layer 110; if the detected value of the temperature sensor is equal to or greater than the threshold, the electrode forming region is cooled by the thermoelectric transducer through insulator layer 110. Such a process can maintain the temperature of the electrode forming region within a predetermined temperature range.

When the temperature of the electrode forming region is to be always maintained at about the room temperature, only heat generated in the electrode forming region can be dissipated; temperature control device 111 may be a heat dissipating device such as a heat sink so as to effectively dissipate heat generated in electrode section 106 that has been irradiated with high intensity light.

As described above, when the refractive index of electro-optical crystal 104 is changed according to an electric field applied thereto, the refractive index changes depending on the temperature of the crystal. When the magnitude for which the refractive index changes fluctuates according to the temperature, the intensity of output light of the optical switch also changes. Thus, to stably operate the optical switch, the temperature at which the refractive index changes in electro-optical crystal 104 needs to be maintained in an appropriate range.

Since the optical switch shown in FIG. 2 has a structure in which electrode section 106 is formed on an optical path of incident light, when electrode section 106 is irradiated with light, the temperature of electrode section 106 tends to rise. When the temperature of electro-optical crystal 104 in the proximity of electrode section 106 changes, as the temperature rise of electrode section 106 rises, the refractive index corresponding to the applied voltage also changes and thereby it becomes difficult to maintain the flatness of the refractive index interface of refractive index change section 108. Thus, for the optical switch shown in FIG. 2, it is preferred that the temperatures of electrode section 106 and electro-optical crystal 104 that are formed in the proximity thereof be maintained constant.

Thus, as shown in FIGS. 14(a), (b), the optical switch according to this embodiment has a structure in which insulation section 110 that has a lower dielectric constant and a higher thermal conductivity than electro-optical crystal 104 is formed in contact with electrode lead-out sections 109 that apply a voltage to each of electrodes 105 from external power supply 107 and temperature control device 111 that controls the temperature of electrode section 106 or dissipates heat generated in electrode section 106 is formed on a plane of insulation section 110. Thus, the temperature of electrode section 106 can be effectively controlled or heat generated in electrode section 106 can be effectively dissipated.

Since the optical switch according to this embodiment has a structure in which insulation section 110 is in contact with part of electrode section 106 (electrode lead-out section 109), insulation section 110 does not disturb refractive index change section 108 that transmits or totally reflects incident light, refractive index change section 108 being formed by applying voltage to electrodes 105.

Insulation section 110 may be made of $SiO_2$, SiN, a graphite sheet, silicone, a low-k (low dielectric constant) material for semiconductor devices (organic polymer, SiOC, etc), or the like. When insulation section 110 is attached to electrode lead-out sections 109 using a bonding agent, the effect of insulation section 110 can be expected. In addition, when insulation section 110 is made of $SiO_2$, SiN, or the like, insulation section 110 can be formed using an existing production facility for semiconductor devices.

Since the optical switch according to this embodiment has a structure in which insulation section 110 is formed in contact with part of electrode section 106 whose characteristics fluctuate the most as the temperature changes and that is formed on an optical path of incident light and thereby thermal energy of temperature control device 111 is transferred to insulation section 110 and to each of electrodes 105, the temperature of the electrode forming region can be effectively controlled or heat generated in electrode section 106 can be effectively dissipated through electrodes 105 and insulation section 110. Thus, even if the temperature of the electrode forming region fluctuates, since the temperature can be controlled in the proximity of electrode section 106 and refractive index change section 108 is stably formed, the operation of the optical switch becomes stable.

In addition, since refractive index change section 108 is stably formed and thereby the direction of reflected light becomes stable, stray light that occurs in electro-optical crystal 104 decreases and also the extinction ratio of the optical switch improves. Moreover, since the temperature of electrode section 106 does not excessively rise, damage to electrode section 106 is prevented and thereby the reliability of the optical switch improves.

When the optical switch according to this embodiment has a structure in which electrodes 105 that compose electrode section 106 are made of a material having a high thermal conductivity (for example, gold, platinum, copper, or the like), the temperature can be more effectively controlled and thereby the optical switch can more stably operate as the temperature fluctuates.

NINTH EMBODIMENT

Figure 15:
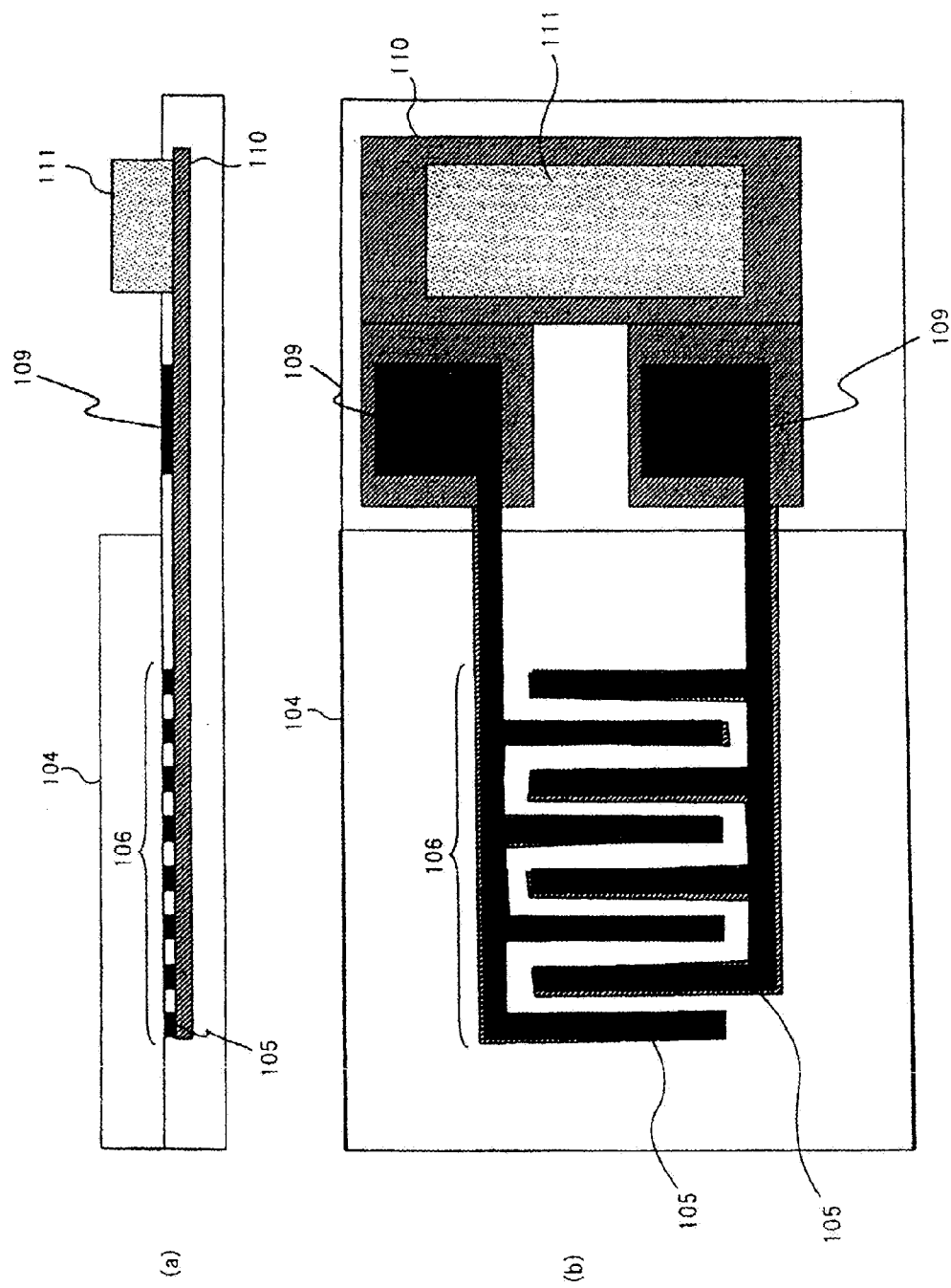
FIG. 15 shows a structure of an optical switch according to a ninth embodiment: (a) is a side sectional view of the drawing; (b) is a plan view of the drawing.

FIG. 15 shows a structure of an optical switch according to a ninth embodiment: (a) is a side sectional view of the drawing; (b) is a plan view of the drawing.

The optical switch according to the ninth embodiment has the same structure as the optical switch shown in FIG. 2 except that insulation section 110 that has a lower dielectric constant and a higher thermal conductivity than electro-optical crystal 104 is formed in contact with electrode section 106 and temperature control device 111 that controls the temperature of electrode section 106 or dissipates heat generated in electrode section 106 is formed on a plane of insulation section 110. In addition, the optical switch according to the ninth embodiment has a structure in which insulation section 110 and electrode section 106 are formed in the same shape in electro-optical crystal 104.

Like the eighth embodiment, temperature control device 111 is a thermoelectric transducer such as a Peltier device that serves to control the temperature of electrode section 106 or a heat dissipating device such as a heat sink that serves to dissipate heat generated in electrode section 106.

When temperature control device 111 is a thermoelectric transducer, a temperature sensor is attached to the optical switch so as to detect the temperature in the electrode forming region including electrode section 106 and refractive index change section 108. The temperature sensor is attached to a portion at which the thermal relationship with the electrode forming region is known (for example, a portion where the heat resistance is known). Thus, the temperature of the electrode forming region can be estimated based on the value detected by the temperature sensor.

Like the eighth embodiment, when the temperature of the electrode forming region is controlled, a predetermined threshold is designated for the detected value of the temperature sensor based on the thermal relationship between the portion at which the temperature sensor is attached and the electrode forming region: if the detected value of the temperature sensor is lower than the threshold, the electrode forming region is heated by thermoelectric transducer through insulator layer 110; if the detected value of the temperature sensor is equal to or greater than the threshold, the electrode forming region is cooled by the thermoelectric transducer through insulator layer 110. Such a process can maintain the temperature of the electrode forming region within a predetermined temperature range.

When the temperature of the electrode forming region is to be always maintained at about room temperature, only heat generated in the electrode forming region can be dissipated; temperature control device 111 may be a heat dissipating device such as a heat sink so as to effectively dissipate heat generated in electrode section 106 that has been irradiated with high intensity light.

As shown in FIGS. 15(a), (b), the optical switch according to the ninth embodiment has a structure in which insulation section 110 having a lower dielectric constant and a higher thermal conductivity than electro-optical crystal 104 is formed in contact with not only electrode lead-out sections 109 but also with one entire plane of electrode section 106. Since the contact area of insulation section 110 and electrode section 106 is greater than that of the optical switch according to the eighth embodiment, heat generated in electrode section 106 can be more effectively disseminated or the temperature of electrode section 106 can be more effectively controlled than the optical switch according to the eighth embodiment.

The optical switch according to this embodiment has a structure in which insulation section 110 and electrode section 106 are formed in the same shape in electro-optical crystal 104. Since insulation section 110 and electrode section 106 are formed in the same shape, insulation section 110 can dissipate heat generated in electrode section 106 or control the temperature of electrode section 106 without disturbing refractive index change section 108 that transmits or totally reflects incident light, refractive index change section 108 being formed by applying a voltage to electrodes 105.

Insulation section 110 may be made of $SiO_2$, SiN, a graphite sheet, silicone, a low-k (low dielectric constant) material for semiconductor devices (organic polymer, SiOC, etc), or the like. When insulation section 110 is made of $SiO_2$, SiN, or the like, insulation section 110 can be formed using an existing production facility for semiconductor devices.

Since the optical switch according to this embodiment has a structure in which insulation section 110 is fully in contact with electrode section 106 including electrode lead-out sections 109, the contact area of insulation section 110 and electrode section 106 becomes large and thereby insulation section 110 can dissipate heat generated in electrode section 106 or control the temperature of electrode section 106 more effectively than the optical switch according to the eighth embodiment. Thus, even if the temperature of the electrode forming region fluctuates, since the temperature can be controlled in the proximity of electrode section 106 and refractive index change section 108 is stably formed, the operation of the optical switch becomes stable.

In addition, since refractive index change section 108 is stably formed and thereby the direction of reflected light becomes stable, stray light that occurs in electro-optical crystal 104 decreases and also the extinction ratio of the optical switch improves. Moreover, since the temperature of electrode section 106 does not excessively rise, damage to electrode section 106 is prevented and thereby the reliability of the optical switch improves.

In addition, since the optical switch according to this embodiment has a structure in which part of planes of each of electrodes 105 is covered with insulation section 110 having a lower dielectric constant than electro-optical crystal 104, the capacitance between electrodes 105 is lower than that of the structure in which all planes of each of electrodes 105 are covered with electro-optical crystal 104 having a higher dielectric constant than electrodes 105. Thus, power consumption of the optical switch according to this embodiment is lower than that of the optical switch according to the eighth embodiment. In addition, since the capacitance of the optical switch according to this embodiment decreases, high speed operation of the optical switch can be accomplished.

Like the eighth embodiment, when the optical switch according to this embodiment has a structure in which electrodes 105 that compose electrode section 106 are made of a material having a high thermal conductivity (for example, gold, platinum, copper, or the like), the temperature can be more effectively controlled and the optical switch can more stably operate as the temperature fluctuates.

TENTH EMBODIMENT

Figure 16:
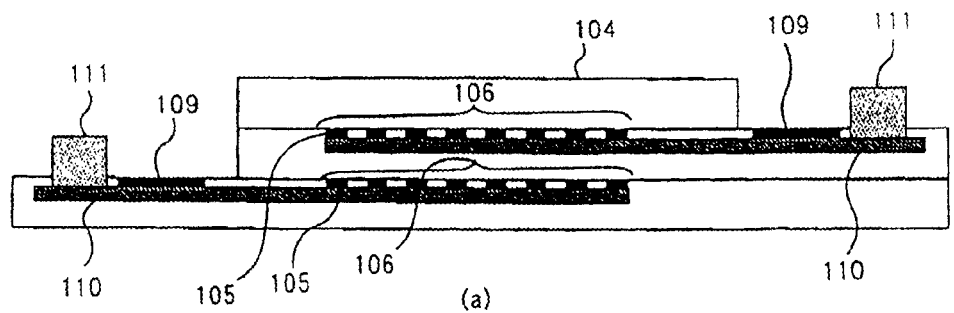
FIG. 16 shows a structure of an optical switch according to a tenth embodiment: (a) is a side sectional view of the drawing; (b) is a plan view of the drawing.
Figure 16:
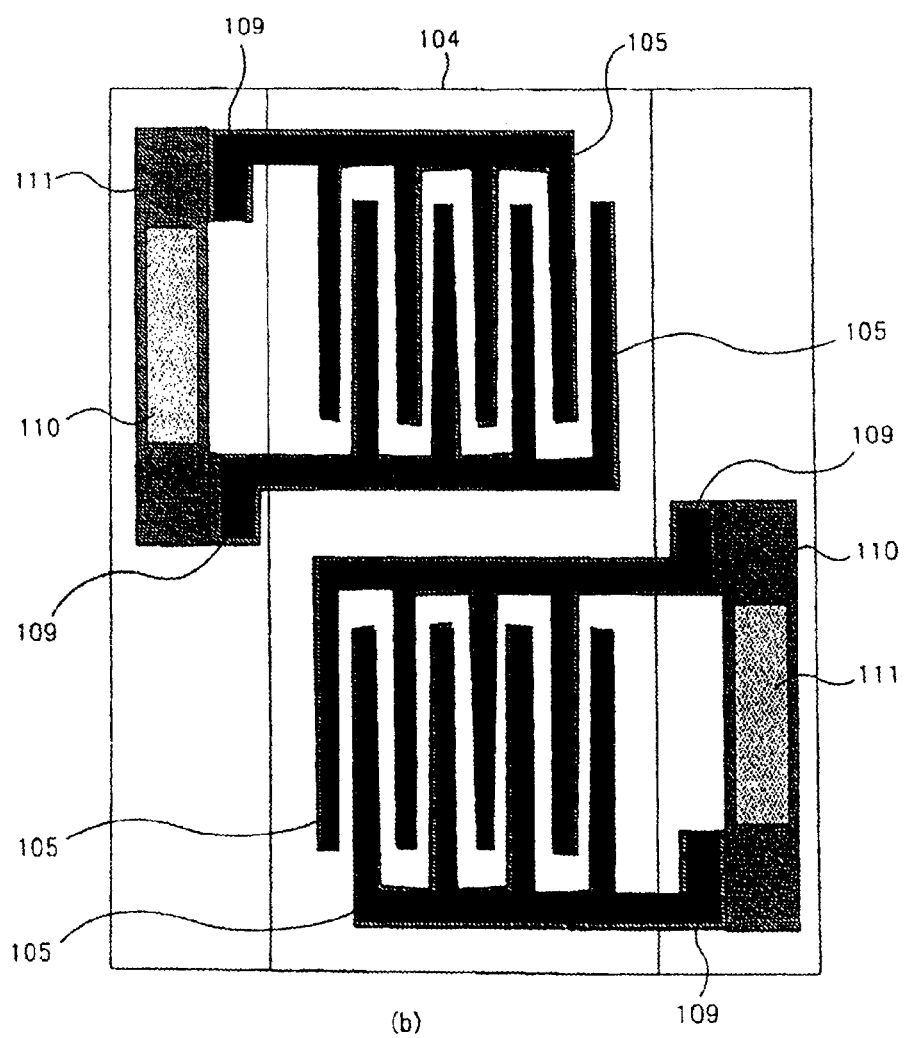
Figure 17:
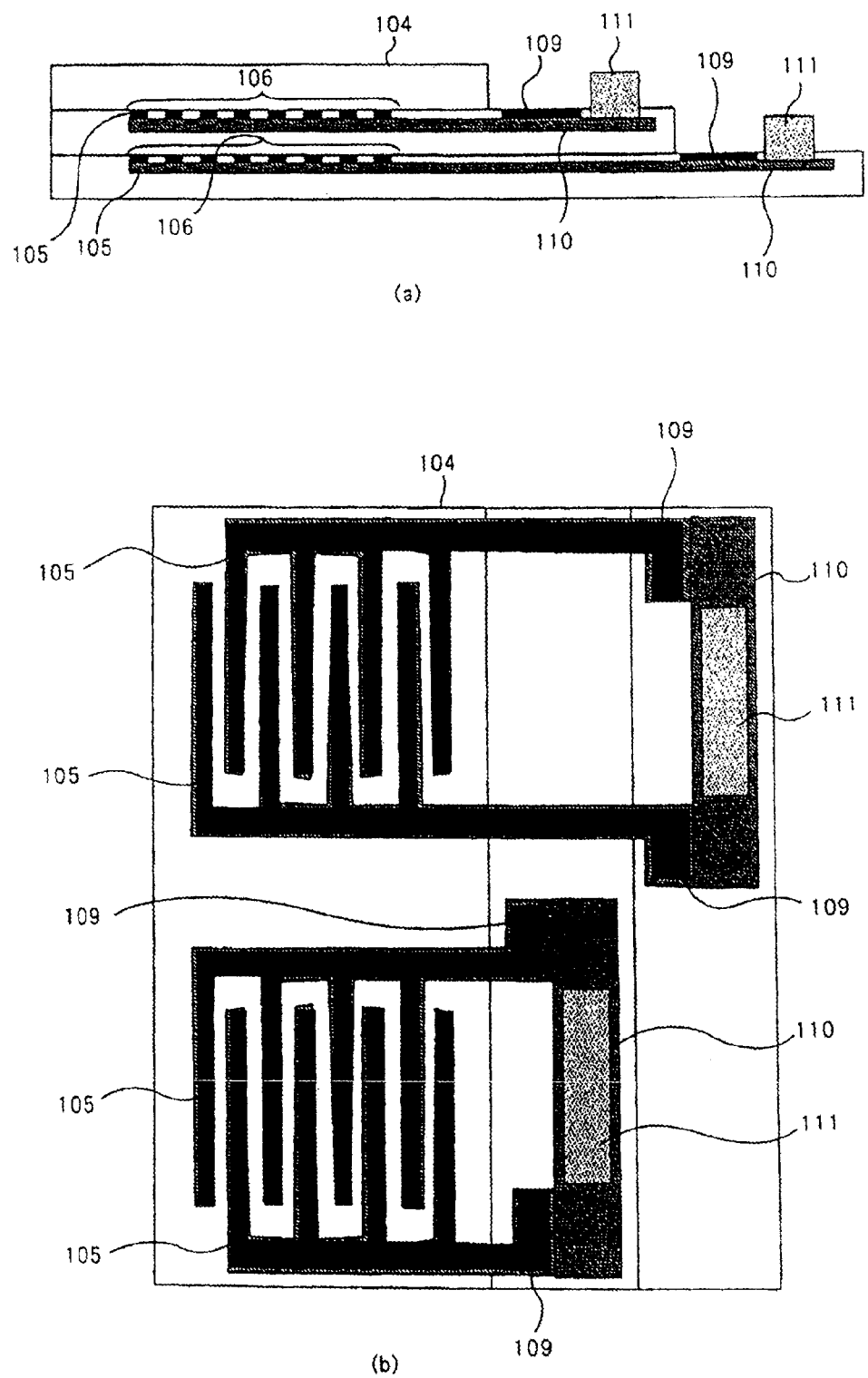
FIG. 17 shows a structure of an exemplified modification of the optical switch according to the tenth embodiment: (a) is a side sectional view of the drawing; (b) is a plan view of the drawing.

FIG. 16 shows a structure of an optical switch according to a tenth embodiment: (a) is a side sectional view of the drawing; (b) is a plan view of the drawing. FIG. 17 shows a structure of an exemplified modification of the optical switch according to the tenth embodiment: (a) is a side sectional view of the drawing; (b) is a plan view of the drawing.

The optical switch shown in FIGS. 16(a), (b) is the same as the optical switch shown in FIGS. 17(a), (b) except for the positions of electrode lead-out sections 109 that connect external power supply 107 to each of electrodes 105.

As shown in FIGS. 16(a) and (b) and FIGS. 17(a) and (b), the optical switch according to the tenth embodiment has a structure in which a plurality of stages of electrode sections 106 (in FIGS. 16[a] and [b] and FIGS. 17[a] and [b], two stages are exemplified) are arranged on an optical path of incident light.

When the optical switch shown in FIGS. 16(a) and (b) and FIGS. 17(a) and (b) has a structure in which electrode section 106 that incident light reaches first reflects the incident light and the later stage of electrode section 106 reflects light that passes through the preceding stage of electrode section 106, the intensity of light that is not reflected by each of electrode sections 106, but that passes through each of electrode sections 106, and that exits from the light exit plane can be decreased. Thus, the optical switch that is provided with a plurality of stages of electrode sections 106 shown in FIGS. 16(a) and (b) and FIGS. 17(a) and (b) can improve the extinction ratio more than the optical switch shown in FIG. 1.

The optical switch according to the tenth embodiment has a structure in which insulation sections 110 having a lower dielectric constant and a higher thermal conductivity than electro-optical crystal 104 are in contact with at least part of each of electrode sections 106 and temperature control devices 111 are formed on one end of each of insulation sections 110.

Alternatively, like the eighth embodiment, insulation sections 110 may be formed in contact with only electrode lead-out sections 109; like the ninth embodiment, insulation sections 110 may be formed fully in contact with electrode sections 106 including electrode lead-out sections 109.

Materials of electrodes 105 that composes electrode section 106, insulation sections 110, and temperature control devices 111 can be the same as those of the eighth and ninth embodiments.

Since this structure allows heat generated in each of electrode sections 106 to be effectively dissipated or the temperature of each of electrode sections 106 to be effectively controlled, even if the temperatures fluctuate, since refractive index change sections 108 are stably formed in the proximities of electrode sections 106, the operation of the optical switch becomes stable.

In addition, since the optical switch according to the tenth embodiment has a structure in which light (incident light) passes through a plurality of stages of electrodes 106, the extinction ratio of the optical switch improves more significantly than the optical switches according to the eighth and ninth embodiments.

In addition, since refractive index change section 108 is stably formed and thereby the direction of reflected light becomes stable, stray light that occurs in electro-optical crystal 104 decreases and also the extinction ratio of the optical switch improves. Moreover, since the temperatures of electrode sections 106 do not excessively rise, electrode sections 106 are prevented from being damaged and thereby the reliability of the optical switch improves.

In addition, like the ninth embodiment, since the optical switch according to the tenth embodiment has a structure in which insulation sections 110 are fully formed respectively on electrode sections 106 including electrode lead-out sections 109 and thereby part of the planes of each of electrodes 105 is covered with insulation section 110 having a lower dielectric constant than electro-optical crystal 104, the capacitance between electrodes 105 is lower than that of the structure in which all planes of each of electrodes 105 are covered with electro-optical crystal 104 having a higher dielectric constant than electrodes 105. Thus, the power consumption of the optical switch according to this embodiment is lower than that of the optical switch according to the eighth embodiment. In addition, since the capacitance of the optical switch according to this embodiment decreases, high speed operation of the optical switch can be accomplished.

ELEVENTH EMBODIMENT

An eleventh embodiment presents a specific example of a device that is provided with optical switches according to any one of the first to tenth embodiments.
[Image Display Device]
First, an image display device that is provided with optical switches according to the present invention will be described.

Figure 18:
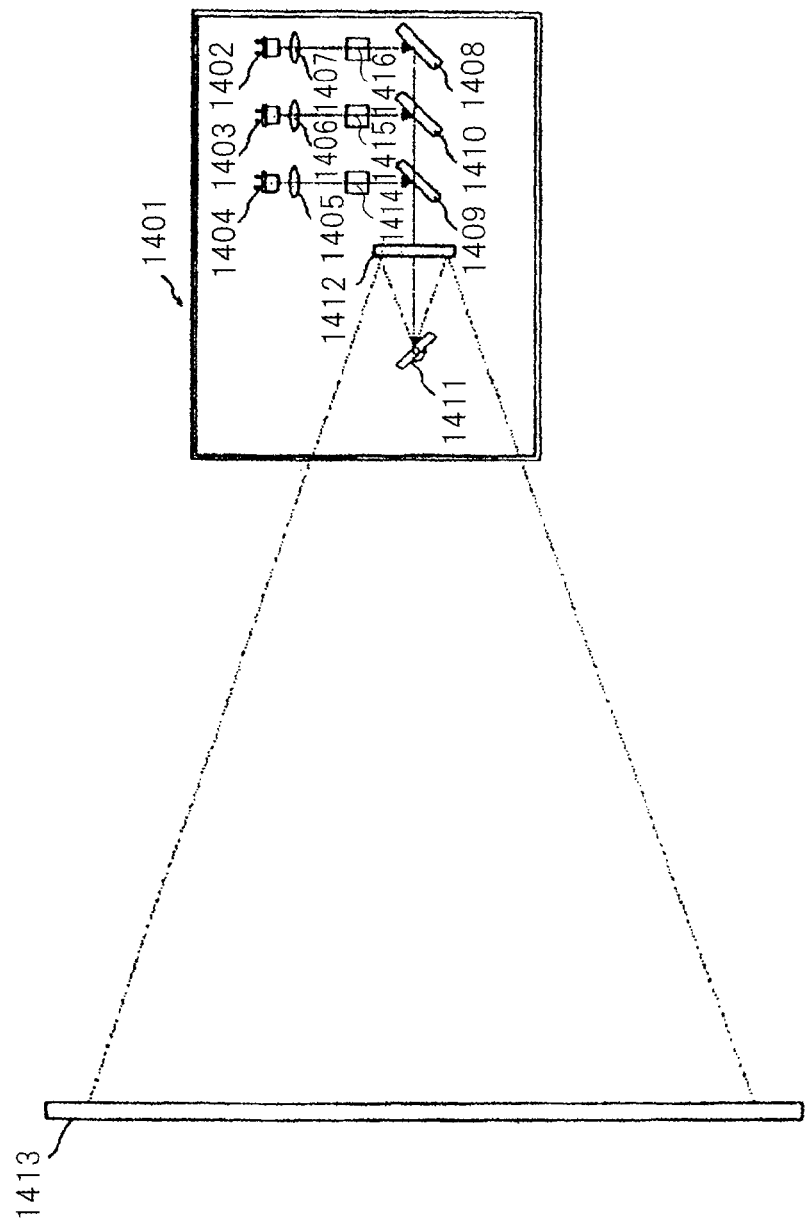
FIG. 18 is a schematic diagram showing an exemplified structure of an image display device provided with optical switches according to the present invention.

FIG. 18 is a schematic diagram showing an exemplary structure of an image display device that is provided with optical switches according to the present invention. Image display device 1401 has laser light sources 1402 to 1404, collimator lenses 1405 to 1407, reflection mirror 1408, dichroic mirrors 1409, 1410, horizontal scanning mirror 1411, vertical scanning mirror 1412, and optical switches 1414 to 1416. Optical switches 1414 to 1416 are optical switches according to any one of the first to tenth embodiments.

Collimator lens 1407, optical switch 1416, and reflection mirror 1408 are successively arranged in the traveling direction of laser light emitted from laser light source 1402. A collimated light beam that passes through collimator lens 1407 enters optical switch 1416. Optical switch 1416 operates according to a control signal supplied from a control section (not shown). During an ON period of the control signal (voltage supply period), since a refractive index change region is formed according to a voltage applied to an electrode section, the refractive index change section reflects incident light. The reflected light deflects from an optical path that extends to reflection mirror 1408. During an OFF period of the control signal (voltage supply stop period), incident light passes through optical switch 1416 and reaches reflection mirror 1408.

Collimator lens 1406, optical switch 1415, and dichroic mirror 1410 are successively arranged in the traveling direction of laser light emitted from laser light source 1403. A collimated light beam that passes through collimator lens 1406 enters optical switch 1415. Like optical switch 1416, optical switch 1415 also operates according to a control signal supplied from the control section (not shown). During an ON period of the control signal (voltage supply period), since a refractive index change region is formed according to a voltage applied to an electrode section, the refractive index change section reflects incident light. The reflected light deflects from an optical path that extends to dichroic mirror 1410. During an OFF period of the control signal (voltage supply stop period), incident light passes through optical switch 1415 and reaches dichroic mirror 1410.

Collimator lens 1405, optical switch 1414, and dichroic mirror 1419 are successively arranged in the traveling direction of laser light emitted from laser light source 1404. A collimated light beam that passes through collimator lens 1405 enters optical switch 1414. Like optical switches 1415, 1416, optical switch 1414 operates according to a control signal supplied from the control section (not shown). During an ON period of the control signal (voltage supply period), since a refractive index change region is formed according to a voltage applied to an electrode section, the refractive index change section reflects incident light. The reflected light deflects from an optical path that extends to dichroic mirror 1409. During an OFF period of the control signal (voltage supply stop period), incident light passes through optical switch 1414 and reaches dichroic mirror 1409.

Dichroic mirror 1410 is located at a position where a light beam that passes through optical switch 1415 and a light beam reflected by reflection mirror 1408 intersect each other. Dichroic mirror 1410 has a wavelength selective characteristic that causes light that passes through optical switch 1415 to be reflected and light reflected by reflection mirror 1408 to pass.

Dichroic mirror 1409 is located at a position where a light beam that passes through optical switch 1414 and a light beam reflected by dichroic mirror 1410 intersect each other. Dichroic mirror 1409 has a wavelength selective characteristic that causes light that passes through optical switch 1414 to be reflected and light that passes through dichroic mirror 1410 to pass.

Horizontally scanning mirror 1411 is located in the travelling direction of a light beam that passes through or is reflected by dichroic mirror 1409 and its operation is controlled according to a horizontal scanning control signal that is outputted from the control section (not shown). Vertical scanning mirror 1412 is located in the travelling direction of a light beam reflected by horizontal scanning mirror 1411 and its operation is controlled according to a vertical scanning control signal that is outputted from the control section (not shown).

Laser light sources 1402, 1403, 1404 emit laser lights corresponding to three primary colors of R, G, B, respectively.

The image display device shown in FIG. 18 turns on/off optical switches 1414, 1415, 1416 and controls horizontal scanning mirror 1411 and vertical scanning mirror 1412 so as to display a color image on screen 1413.
[Image Forming Device]
Next, an image forming device that is provided with an optical switch according to the present invention will be described.

Figure 19:
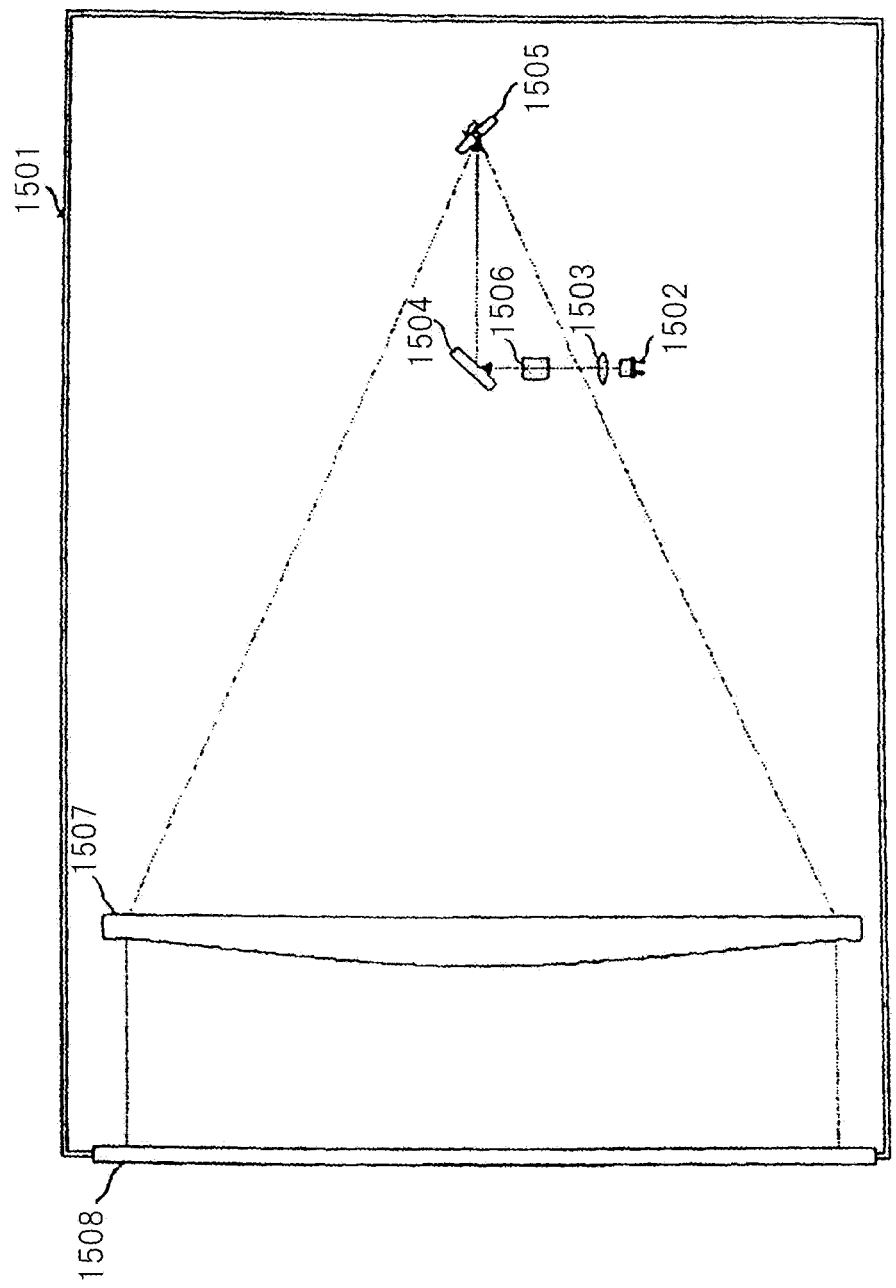
FIG. 19 is a schematic diagram showing an exemplified structure of an image forming device provided with an optical switch according to the present invention.

FIG. 19 is a schematic diagram showing an exemplified structure of an image forming device that is provided with an optical switch according to the present invention. Image forming device 1501 has laser light source 1502, collimator lens 1503, reflection mirror 1504, scanning mirror 1505, optical switch 1506, fθ lens 1507, and photoreceptor 1508. Optical switch 1506 is an optical switch according to any one of the first embodiment to tenth embodiments.

Collimator lens 1503, optical switch 1506, and reflection mirror 1504 are successively arranged in the traveling direction of laser light emitted from laser light source 1502. A collimated light beam that passes through collimator lens 1503 enters optical switch 1506. Optical switch 1506 operates according to a control signal supplied from a control section (not shown). During an ON period of the control signal (voltage supply period), since a refractive index change region is formed according to a voltage applied to an electrode section, it reflects incident light. The reflected light deflects from the optical path extending to reflection mirror 1505. During an OFF period of the control signal (voltage supply stop period), the incident light passes through optical switch 1506 and reaches reflection mirror 1505.

Scanning mirror 1505 is located in the travelling direction of a light beam reflected by reflection mirror 1505 and its operation is controlled according to a scanning control signal that is outputted from a control section (not shown). Photoreceptor 1508 is irradiated with light that is reflected by scanning mirror 1505 and then passes through fθ lens 1507.

The image forming device shown in FIG. 19 turns on/off optical switch 1506 and controls scanning mirror 1505 so as to form an image on photoreceptor 1508.

Alternatively, the image forming device shown in FIG. 19 may be used as a device that directly projects a scanned image on photoreceptor 1508 without causing it to pass through fθ lens 1507 located immediately before photoreceptor 1508.

The optical switches presented in the foregoing first to tenth embodiments and systems using them are just examples of the present invention and their procedures and structures can be changed without departing from the spirit of the present invention.

Now, with reference to the embodiments, the present invention has been described. However, it should be understood by those skilled in the art that the structure and details of the present invention may be changed in various manners without departing from the scope of the present invention.

This application claims priority based on Japanese Patent Applications No. 2008-322727, No. 2008-322734 and No. 2008-322735 filed on Dec. 18, 2008, the disclosure of which is incorporated herein by reference in its entirety.

The invention claimed is:

1. An optical switch that changes a refractive index of an electro-optical crystal according to an electric field applied to said electro-optical crystal so as to switch depending on whether said electro-optical crystal enables incident light to pass through or whether said electro-optical crystal enables incident light to be totally reflected, comprising:
   an electrode section that is composed of a plurality of electrodes and that is formed in said electro-optical crystal, a principal plane including the largest area of each of said plurality of electrodes being present on a same plane of said electro-optical crystal;
   an insulator layer that is formed on at least one plane of said electro-optical crystal, the plane being parallel with said electrode section, said insulator layer being made of an insulator having a lower dielectric constant than said electro-optical crystal; and
   a temperature control device that is formed to be in contact with said insulator layer and that controls a temperature of said electrode section or that dissipates heat generated in said electrode section.

2. An optical switch that changes a refractive index of an electro-optical crystal according to an electric field applied to said electro-optical crystal so as to switch depending on whether said electro-optical crystal enables incident light to pass through or whether said electro-optical crystal enables incident light to be totally reflected, comprising:
   an electrode section that is composed of a plurality of electrodes and that is formed in said electro-optical crystal, a principal plane including the largest area of each of said plurality of electrodes being present on a same plane of said electro-optical crystal;
   an insulator layer that is formed on at least one plane of said electro-optical crystal, the plane being parallel with said electrode section, said insulator layer being made of an insulator having a lower dielectric constant than said electro-optical crystal; and
   a temperature control device that is formed to be in contact with said insulator layer and that controls a temperature of said electrode section or that dissipates heat generated in said electrode section,
   wherein said electro-optical crystal has a refractive index change section whose refractive index changes according to the electric field is applied to said electrode section, said refractive index change section fully covers said electrode section, and a refractive index interface of said refractive index change section is evenly formed.

3. The optical switch according to claim 1,
   wherein said insulator layer is made of a material having a higher thermal conductivity than said electro-optical crystal.

4. The optical switch according to claim 1,
   wherein said insulator layer and said temperature control device are formed on a plane of said electro-optical crystal other than a light incident plane from which light enters and a light exit plane from which light exits.

5. The optical switch according to claim 1,
   wherein said insulator layer is made of a material that also functions as a light absorption layer that absorbs light.

6. An optical switch that changes a refractive index of an electro-optical crystal according to an electric field applied to said electro-optical crystal so as to switch depending on whether said electro-optical crystal enables incident light to pass through or whether said electro-optical crystal enables incident light to be totally reflected, comprising:
   an electrode section that is composed of a plurality of electrodes and that is formed in said electro-optical crystal, a principal plane including the largest area of each of said plurality of electrodes being present on a same plane of said electro-optical crystal,
   wherein anti reflection coats are formed respectively on a light incident plane to which light enters and on at least one of a light exit plane from which transmitted light exits and a light exit plane from which reflected light exits.

7. An optical switch that changes a refractive index of an electro-optical crystal according to an electric field applied to said electro-optical crystal so as to switch depending on whether said electro-optical crystal enables incident light to pass through or whether said electro-optical crystal enables incident light to be totally reflected, comprising:
   an electrode section that is composed of a plurality of electrodes and that is formed in said electro-optical crystal and that applies the electric field to the electro-optical crystal;
   anti reflection coats formed respectively on a light incident plane to which light enters and on at least one of a light exit plane from which transmitted light exits and a light exit plane from which reflected light exits,
   wherein said electro-optical crystal has a refractive index change section whose refractive index changes according to the electric field is applied to said electrode section, said refractive index change section fully covers said electrode section, and a refractive index interface of said refractive index change section is evenly formed.

8. The optical switch according to claim 6,
   wherein a light absorption layer that absorbs light is formed on either said light exit plane from which said transmitted light exits or said on light exit plane from which said reflected light exits.

9. The optical switch according to claim 6,
   wherein an anti reflection coat is formed on at least one of planes of said electro-optical crystal other than said light incident plane, and on said light exit plane of said transmitted light or said light incident plane and said light exit plane of said reflection light.

10. The optical switch according to claim 6,
    wherein a light absorption layer is formed on at least one of planes of said electro-optical crystal other than said light incident plane, and on said light exit plane of said transmitted light or said light incident plane and said light exit plane of said reflection light.

11. The optical switch according to claim 6, further comprising:
    an insulator layer that is formed on at least one plane of said electro-optical crystal, the plane being parallel with said electrode section, said insulator layer being made of an insulator having a lower dielectric constant than said electro-optical crystal; and a temperature control device that is formed to be in contact with said insulator layer and that controls a temperature of said electrode section or that dissipates heat generated in said electrode section.

12. The optical switch according to claim 11,
wherein said insulator layer is made of a material having a higher thermal conductivity than said electro-optical crystal.

13. An optical switch that changes a refractive index of an electro-optical crystal according to an electric field applied to said electro-optical crystal so as to switch depending on whether said electro-optical crystal enables incident light to pass through or whether said electro-optical crystal enables incident light to be totally reflected, comprising:

an electrode section that is composed of a plurality of electrodes and that is formed in said electro-optical crystal, a principal plane including the largest area of each of said plurality of electrodes being present on a same plane of said electro-optical crystal;

an insulation section that is formed in contact with at least part of said electrode section that has a higher thermal conductivity and a lower dielectric constant than said electro-optical crystal; and a temperature control section that is formed on a plane of said insulation section and dissipates heat generated in said electrode section or controls a temperature of said electrode section.

14. An optical switch that changes a refractive index of an electro-optical crystal according to an electric field applied to said electro-optical crystal so as to switch depending on whether said electro-optical crystal enables incident light to pass through or whether said electro-optical crystal enables incident light to be totally reflected, comprising:

an electrode section that is composed of a plurality of electrodes and that is formed in said electro-optical crystal that applies the electric field to said electro-optical crystal;

an insulation section that is formed in contact with at least part of said electrode section that has a higher thermal conductivity and a lower dielectric constant than said electro-optical crystal; and a temperature control section that is formed on a plane of said insulation section and controls a temperature of said electrode section or dissipates heat generated in said electrode section, wherein said electro-optical crystal has a refractive index change section whose refractive index changes according to the electric field applied to said electrode section, said refractive index change section fully covers said electrode section, and a refractive index interface of said refractive index change section is evenly formed.

15. The optical switch according to claim 13,
wherein said insulation section is formed in said electro-optical crystal and has a same shape as said electrode section.

16. The optical switch according to claim 13,
wherein said electrodes are made of a material having a higher thermal conductivity than said electro-optical crystal.

17. The optical switch according to claim 1,
wherein said electrodes have a same film thickness and are arranged in parallel and at an equal interval.

18. The optical switch according to claim 1,
wherein a plurality of said electrode sections are formed in said electro-optical crystal, and
wherein electrode planes of said electrodes of said electrode sections are arranged parallel to each other.

19. The optical switch according to claim 1,
wherein a voltage is applied to said electrodes such that polarities of adjacent two of said electrodes are different from each other.

20. An image display device, comprising:
a light source;
an optical switch according to claim 1, said optical switch modulating light emitted from said light source;
scanning means that scans a modulated light beam, on an external screen, that passes through said optical switch; and
a control section that controls a modulation operation of said optical switch according to an external control signal.

21. An image forming device, comprising:
a light source;
a photoreceptor;
an optical switch according to claim 1, said optical switch modulating light emitted from said light source;
scanning means that scans a modulated light beam, on said photoreceptor, that passes through said optical switch; and
a control section that controls a modulation operation of said optical switch according to an external control signal.

* * * * *